US012700312B2

(12) United States Patent (10) Patent No.: US 12,700,312 B2
Brannan et al. (45) Date of Patent: Aug. 4, 2026

(54) METHOD AND SYSTEM FOR ALERTING USERS OF INCIDENT-PRONE LOCATIONS

(71) Applicant: STATE FARM MUTUAL AUTOMOBILE INSURANCE COMPANY, Bloomington, IL (US)

(72) Inventors: Joseph Robert Brannan, Bloomington, IL (US); Vicki King, Bloomington, IL (US); Brian Mark Fields, Phoenix, AZ (US); Nathan L. Tofte, Downs, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 47 days.

(21) Appl. No.: 18/382,211

(22) Filed: Oct. 20, 2023

(65) Prior Publication Data

US 2024/0395145 A1 Nov. 28, 2024

Related U.S. Application Data

(60) Provisional application No. 63/525,051, filed on Jul. 5, 2023, provisional application No. 63/468,450, filed on May 23, 2023.

(51) Int. Cl.
*G08G 1/14* (2006.01)
*G01C 21/36* (2006.01)
(Continued)

(52) U.S. Cl.
CPC ......... *G08G 1/145* (2013.01); *G01C 21/3685* (2013.01); *G06F 40/40* (2020.01); *G06Q 40/08* (2013.01); *G08G 1/0967* (2013.01)

(58) Field of Classification Search
CPC .. G08G 1/145; G08G 1/0967; G01C 21/3685; G06F 40/40; G06Q 40/08
See application file for complete search history.

(56) References Cited

U.S. PATENT DOCUMENTS 7,698,342 B1 4/2010 Evans et al.
8,095,393 B2 1/2012 Seifert et al.
(Continued)

FOREIGN PATENT DOCUMENTS

CA 3227939 A1 2/2023
CN 112164391 A 1/2021
(Continued)

OTHER PUBLICATIONS

Anonymous, Roots Automation Introduces InsurGPT—the World's Most Advanced Generative AI Model for Insurance. Retrieved from the Internet at: https://ffnews.com/newsarticle/roots-automation-introduces-insuraot-the-worlds-most-advanced-generative-ai-model-for-insurance/ (published May 15, 2023).
(Continued)

*Primary Examiner* — Ryan W Sherwin
(74) *Attorney, Agent, or Firm* — MARSHALL, GERSTEIN & BORUN LLP

(57) ABSTRACT

Methods and systems for alerting a user of crime-prone locations are disclosed herein. In some embodiments, the method comprises: (1) receiving, by one or more processors from a user device, location data of the user device and a destination input by the user; (2) determining, by the one or more processors, based upon the location data, that the user device is approaching the destination; (3) loading, by the one or more processors, a crime density map surrounding the destination; (4) determining, by the one or more processors, based upon the crime density map, at least one non-crime-prone parking spot, wherein the at least one non-crime-prone parking spot meets at least one predetermined criterion; and/or (5) presenting, by the one or more processors via the user device, an indication of the at least one non-crime-prone parking spot.

16 Claims, 17 Drawing Sheets

(51) Int. Cl.
　　*G06F 40/40*　　　　(2020.01)
　　*G06Q 40/08*　　　　(2012.01)
　　*G08G 1/0967*　　　(2006.01)

(56)　　　　　　References Cited

U.S. PATENT DOCUMENTS

| | | |
|---|---|---|
| 8,346,563 B1 | 1/2013 | Hjelm et al. |
| 9,830,748 B2 | 11/2017 | Rosenbaum |
| 9,990,782 B2 | 6/2018 | Rosenbaum |
| 10,043,217 B1 | 8/2018 | Bolden et al. |
| 10,055,793 B1 | 8/2018 | Call et al. |
| 10,181,159 B1 | 1/2019 | Allen et al. |
| 10,217,068 B1 | 2/2019 | Davis et al. |
| 10,229,394 B1 | 3/2019 | Davis et al. |
| 10,269,190 B2 | 4/2019 | Rosenbaum |
| 10,387,963 B1 | 8/2019 | Leise et al. |
| 10,387,966 B1 | 8/2019 | Shah et al. |
| 10,467,824 B2 | 11/2019 | Rosenbaum |
| 10,482,554 B1 | 11/2019 | Vukich et al. |
| 10,497,250 B1 | 12/2019 | Hayward et al. |
| 10,535,104 B1 | 1/2020 | Mitchell et al. |
| 10,579,971 B1 | 3/2020 | Davis et al. |
| 10,635,751 B1 | 4/2020 | Relangi et al. |
| 10,679,296 B1 | 6/2020 | Devereaux et al. |
| 10,769,953 B1 | 9/2020 | Salles et al. |
| 11,038,821 B1 | 6/2021 | Harding et al. |
| 11,087,404 B1 | 8/2021 | Devereaux et al. |
| 11,127,081 B1 | 9/2021 | Kullman et al. |
| 11,227,452 B2 | 1/2022 | Rosenbaum |
| 11,238,506 B1 | 2/2022 | Tomlinson et al. |
| 11,250,515 B1 | 2/2022 | Feiteira et al. |
| 11,407,410 B2 | 8/2022 | Rosenbaum |
| 11,438,283 B1 | 9/2022 | White et al. |
| 11,518,391 B1 | 12/2022 | Sanchez |
| 11,524,707 B2 | 12/2022 | Rosenbaum |
| 11,544,807 B1 | 1/2023 | Breitweiser et al. |
| 11,594,083 B1 | 2/2023 | Rosenbaum |
| 11,669,907 B1 | 6/2023 | Behrens et al. |
| 11,693,726 B2 | 7/2023 | Lozano et al. |
| 11,720,903 B1 | 8/2023 | Henryson et al. |
| 11,757,807 B2 | 9/2023 | Bhardwaj et al. |
| 11,783,421 B2 | 10/2023 | Huls |
| 11,790,296 B1 | 10/2023 | Henryson et al. |
| 11,818,111 B1 | 11/2023 | Debolt |
| 11,836,805 B1 | 12/2023 | Culbertson et al. |
| 11,837,004 B1 | 12/2023 | Agrahari et al. |
| 11,853,926 B1 | 12/2023 | Jones et al. |
| 11,922,515 B1 | 3/2024 | Lombard et al. |
| 12,087,152 B1 | 9/2024 | Buentello et al. |
| 12,217,606 B1 | 2/2025 | Cheng et al. |
| 12,236,377 B2 | 2/2025 | Sohum et al. |
| 12,248,993 B2 | 3/2025 | Brannan et al. |
| 2001/0027403 A1 | 10/2001 | Peterson et al. |
| 2001/0037265 A1 | 11/2001 | Kleinberg |
| 2002/0002475 A1 | 1/2002 | Freedman et al. |
| 2002/0112011 A1 | 8/2002 | Washington |
| 2003/0028448 A1 | 2/2003 | Joseph et al. |
| 2006/0212566 A1* | 9/2006 | Boujard ................ G07B 15/04 |
| | | 709/224 |
| 2008/0056473 A1 | 3/2008 | Kent et al. |
| 2009/0125320 A1 | 5/2009 | Bickett |
| 2009/0240531 A1 | 9/2009 | Hilborn |
| 2009/0287509 A1 | 11/2009 | Basak et al. |
| 2010/0145734 A1 | 6/2010 | Becerra et al. |
| 2011/0119574 A1 | 5/2011 | Rogers et al. |
| 2011/0295623 A1 | 12/2011 | Behringer et al. |
| 2011/0313794 A1 | 12/2011 | Feeney |
| 2012/0101852 A1 | 4/2012 | Albert |
| 2012/0124485 A1 | 5/2012 | Scherpa et al. |
| 2012/0143634 A1 | 6/2012 | Beyda et al. |
| 2012/0303390 A1 | 11/2012 | Brook et al. |
| 2013/0204619 A1 | 8/2013 | Berman et al. |
| 2013/0218603 A1 | 8/2013 | Hagelstein et al. |
| 2013/0226624 A1 | 8/2013 | Blessman et al. |
| 2014/0094991 A1 | 4/2014 | Bouillet et al. |

| | | |
|---|---|---|
| 2014/0100892 A1* | 4/2014 | Collopy ............ G06Q 30/0201 |
| | | 705/4 |
| 2014/0222469 A1 | 8/2014 | Stahl et al. |
| 2014/0358731 A1 | 12/2014 | Itte et al. |
| 2014/0379385 A1 | 12/2014 | Duncan et al. |
| 2015/0170288 A1 | 6/2015 | Harton et al. |
| 2015/0213556 A1 | 7/2015 | Haller, Jr. |
| 2015/0338235 A1 | 11/2015 | Schmidt et al. |
| 2015/0339759 A1 | 11/2015 | Pope et al. |
| 2016/0041069 A1 | 2/2016 | Huang et al. |
| 2016/0071217 A1 | 3/2016 | Edwards et al. |
| 2016/0086231 A1 | 3/2016 | Darey |
| 2016/0238397 A1* | 8/2016 | Caira ..................... G08G 1/143 |
| 2016/0273181 A1 | 9/2016 | Smith |
| 2017/0004508 A1 | 1/2017 | Mansfield et al. |
| 2017/0060694 A1 | 3/2017 | Makhov et al. |
| 2017/0103346 A1 | 4/2017 | Bodell et al. |
| 2017/0132643 A1 | 5/2017 | Sagade et al. |
| 2017/0132666 A1 | 5/2017 | Slavin |
| 2017/0191848 A1* | 7/2017 | Jones ................. G01C 21/3484 |
| 2018/0047288 A1* | 2/2018 | Cordell .................. G08G 1/166 |
| 2018/0075538 A1* | 3/2018 | Konrardy .............. G08G 1/005 |
| 2018/0082683 A1 | 3/2018 | Chen et al. |
| 2018/0173999 A1 | 6/2018 | Renard |
| 2018/0293483 A1 | 10/2018 | Abramson et al. |
| 2018/0293660 A1 | 10/2018 | Rakshe et al. |
| 2018/0334176 A1 | 11/2018 | Park |
| 2019/0037077 A1 | 1/2019 | Konig et al. |
| 2019/0095822 A1 | 3/2019 | Rugel et al. |
| 2019/0114715 A1 | 4/2019 | Hessinger et al. |
| 2019/0122121 A1 | 4/2019 | Yu |
| 2019/0306327 A1 | 10/2019 | Matysiak et al. |
| 2019/0332661 A1 | 10/2019 | Halprin et al. |
| 2019/0391827 A1 | 12/2019 | Simanovich et al. |
| 2020/0019893 A1 | 1/2020 | Lu |
| 2020/0042649 A1 | 2/2020 | Bakis et al. |
| 2020/0104876 A1 | 4/2020 | Chintakindi et al. |
| 2020/0143481 A1 | 5/2020 | Brown et al. |
| 2020/0154170 A1 | 5/2020 | Wu et al. |
| 2020/0167134 A1 | 5/2020 | Dey et al. |
| 2020/0210490 A1 | 7/2020 | Hutchins |
| 2020/0274962 A1 | 8/2020 | Martin et al. |
| 2020/0285225 A1 | 9/2020 | Lankehanumaiah et al. |
| 2020/0339160 A1 | 10/2020 | Rosenbaum |
| 2021/0064932 A1 | 3/2021 | Wang et al. |
| 2021/0073330 A1 | 3/2021 | Inagaki et al. |
| 2021/0117923 A1 | 4/2021 | Gray et al. |
| 2021/0152496 A1 | 5/2021 | Kim et al. |
| 2021/0200950 A1 | 7/2021 | Basu et al. |
| 2021/0203784 A1 | 7/2021 | Konig et al. |
| 2021/0256616 A1 | 8/2021 | Hayward et al. |
| 2021/0271820 A1 | 9/2021 | Raghupatruni et al. |
| 2021/0273892 A1 | 9/2021 | Rakshit |
| 2021/0295203 A1 | 9/2021 | Liao et al. |
| 2021/0350357 A1* | 11/2021 | Lafontaine ........... G06Q 20/401 |
| 2021/0357771 A1 | 11/2021 | Flowers et al. |
| 2021/0357790 A1 | 11/2021 | Volkov et al. |
| 2021/0365955 A1 | 11/2021 | Galante et al. |
| 2021/0366048 A1 | 11/2021 | Westhues et al. |
| 2021/0374092 A1 | 12/2021 | Sahay |
| 2021/0383494 A1 | 12/2021 | Leise et al. |
| 2021/0390950 A1 | 12/2021 | Kumar et al. |
| 2021/0406938 A1 | 12/2021 | Thakral |
| 2022/0004630 A1 | 1/2022 | Almukaynizi et al. |
| 2022/0019496 A1 | 1/2022 | Lozano et al. |
| 2022/0091957 A1 | 3/2022 | Szczepanik et al. |
| 2022/0092893 A1 | 3/2022 | Rosenbaum |
| 2022/0094789 A1 | 3/2022 | Lau et al. |
| 2022/0114594 A1 | 4/2022 | Nunes et al. |
| 2022/0136847 A1* | 5/2022 | Higuchi ............ G01C 21/3461 |
| | | 340/932.2 |
| 2022/0176971 A1 | 6/2022 | Nordh |
| 2022/0198531 A1 | 6/2022 | Cleaver et al. |
| 2022/0261535 A1 | 8/2022 | Madaan et al. |
| 2022/0269583 A1 | 8/2022 | Plawecki |
| 2022/0279014 A1 | 9/2022 | Stokes et al. |
| 2022/0293107 A1 | 9/2022 | Leaman et al. |
| 2022/0300993 A1 | 9/2022 | Chaudhry et al. |
| 2022/0308943 A1 | 9/2022 | Srinivasan et al. |

(56) References Cited

U.S. PATENT DOCUMENTS

| | | |
|---|---|---|
| 2022/0340148 A1 | 10/2022 | Rosenbaum |
| 2022/0366459 A1 | 11/2022 | Vieyra |
| 2023/0005070 A1 | 1/2023 | Nguyen et al. |
| 2023/0017739 A1 | 1/2023 | Feldman et al. |
| 2023/0023869 A1 | 1/2023 | Ganesan et al. |
| 2023/0060300 A1 | 3/2023 | Rosenbaum |
| 2023/0064816 A1 | 3/2023 | Matsuoka et al. |
| 2023/0105564 A1 | 4/2023 | Breitweiser et al. |
| 2023/0108454 A1 | 4/2023 | Gidwaney et al. |
| 2023/0110941 A1 | 4/2023 | Makhija et al. |
| 2023/0116639 A1 | 4/2023 | Patt et al. |
| 2023/0140931 A1 | 5/2023 | Anderson et al. |
| 2023/0141853 A1 | 5/2023 | Vu et al. |
| 2023/0244938 A1 | 8/2023 | Wei et al. |
| 2023/0259821 A1 | 8/2023 | Travalini et al. |
| 2023/0267512 A1 | 8/2023 | Isackson et al. |
| 2023/0267694 A1 | 8/2023 | Breitweiser et al. |
| 2023/0290502 A1 | 9/2023 | Zhi et al. |
| 2023/0298567 A1 | 9/2023 | Tan et al. |
| 2023/0316412 A1 | 10/2023 | Behrens et al. |
| 2023/0343149 A1 | 10/2023 | Volos et al. |
| 2023/0385939 A1 | 11/2023 | Tsuchiyma et al. |
| 2023/0410801 A1 | 12/2023 | Mishra |
| 2024/0073219 A1 | 2/2024 | Maizels et al. |
| 2024/0102814 A1* | 3/2024 | Karri ................. G01C 21/3685 |
| 2024/0119424 A1 | 4/2024 | Lofvers et al. |
| 2024/0167864 A1 | 5/2024 | Donovan et al. |
| 2024/0168611 A1 | 5/2024 | Pham et al. |
| 2024/0248920 A1 | 7/2024 | Qiao et al. |
| 2024/0249557 A1 | 7/2024 | Chavali |
| 2024/0256780 A1 | 8/2024 | Douglas et al. |
| 2024/0281888 A1 | 8/2024 | Fields et al. |
| 2024/0281889 A1 | 8/2024 | Fields et al. |
| 2024/0281890 A1 | 8/2024 | Fields et al. |
| 2024/0281891 A1 | 8/2024 | Fields et al. |
| 2024/0289362 A1 | 8/2024 | Williams et al. |
| 2024/0289596 A1 | 8/2024 | Williams et al. |
| 2024/0289851 A1 | 8/2024 | Williams et al. |
| 2024/0291777 A1 | 8/2024 | Fields et al. |
| 2024/0303745 A1 | 9/2024 | Fields et al. |
| 2024/0311271 A1 | 9/2024 | Fields et al. |
| 2024/0311921 A1 | 9/2024 | Fields et al. |
| 2024/0311922 A1 | 9/2024 | Fields et al. |
| 2024/0328410 A1 | 10/2024 | Williams et al. |
| 2024/0331047 A1 | 10/2024 | Williams et al. |
| 2024/0331068 A1 | 10/2024 | Williams et al. |
| 2024/0362686 A1 | 10/2024 | Williams et al. |
| 2024/0371367 A1 | 11/2024 | Churgin et al. |
| 2024/0371376 A1 | 11/2024 | Bohl et al. |
| 2024/0395138 A1 | 11/2024 | Brannan et al. |
| 2024/0403596 A1 | 12/2024 | Brannan et al. |
| 2024/0412294 A1 | 12/2024 | Brannan et al. |
| 2024/0414105 A1 | 12/2024 | Brannan et al. |
| 2025/0013555 A1 | 1/2025 | Papadopoulos et al. |

FOREIGN PATENT DOCUMENTS

| | | |
|---|---|---|
| EP | 2946168 A1 | 11/2015 |
| EP | 3239686 A1 | 11/2017 |
| EP | 3578433 B1 | 8/2020 |
| EP | 3730375 B1 | 10/2021 |
| EP | 3960576 A1 | 3/2022 |
| EP | 4190659 A1 | 6/2023 |
| EP | 4190660 A1 | 6/2023 |
| IN | 201741025968 | 12/2017 |
| KR | 10-2148616 B1 | 8/2020 |
| WO | 2013/059620 A2 | 4/2013 |
| WO | 2023/021162 A2 | 2/2023 |

OTHER PUBLICATIONS

Dickson, How to create a private ChatGPT that interacts with your local documents, TechTalks. Retrieved from the Internet at:

<URL:https://bdtechtalks.com/2023/06/01/create-privategpt-local-llm/> (Jun. 2023).

Financial Times, "Insurer Zurich experiments with ChatGPT for claims and data mining" Web page downloaded from Internet at <https://www.ft.com/content/45e5525c-ac45-4a49-a55c-8833d1a036b9 >. Retrieved from internet on Apr. 25, 2023.

Introducing Agent M—a powerful Large Language model or ChatGPT based Master Agent developer framework, powered by Floatbot platform, that lets you create multiple application-specific LLM-based Agent(s). Retrieved from the internet at: <URL:https://www.linkedin.com/posts/jimmypadia_nyse-floor-talk-floatbot-activity-7089664064603234304-60TU?utm source=share&utm medium=member android> (2023).

Isenberg, The Compliance Tasks ChatGPT Can (and Can't) Handle, Ignites (published Apr. 3, 2023).

Life Annuity Specialist, "What ChatGPT's Chores May Look Like in Life Insurance Industry" Web page downloaded from the Internet at <https://www.lifeannuityspecialist.com/pc/4031524/521574?all=true>. Retrieved from the Internet on Apr. 25, 2023.

Limra, Should Financial Services Companies Consider Open AI? Web page downloaded from Internet at <https://www.limra.com/en/trending-topics/publications/marketfacts/2023/should-financial-services-companies-consider-open-ai>. Retrieved from Internet on Apr. 28, 2023.

Morelli, Will ChatGPT, artificial intelligence replace financial professionals any time soon?, Insurance NewsNet. Retrieved from the Internet at: <https://insurancenewsnet.com/innarticle/will-chatgpt-artificial-intelliaence-reolace-financial-orofessionals-any-time-soon> (oublished Jan. 23, 2023).

Morris, Morgan Stanley Developing Chatbot with OpenAI, Ignites (published Mar. 15, 2023).

Munk, Will AI models like ChatGPT take your insurance job?, Life Annuity Speciality (published Mar. 7, 2023).

OpenPR Worldwide Public Relations, Press release, "Floatbot.AI Unveils Revolutionary Agent M—Generative AI (LLM or ChatGPT) Based Master Agent developer framework," Web page downloaded from Internet at <https://www.openpr.com/news/3147235/floatbot-ai-unveils-revolutionary-aqent-m-qenerative-ai-llm>. Retrieved from Internet on Aug. 1, 2023.

Rengachary et al., ChatGPT: A Conversation About Underwriting and Life Insurance. Retrieved from the internet at: https://www.coverager.com/chatgpt-a-conversation-about-underwriting-and-life-insurance/ (published Apr. 3, 2023).

The Future of Car Insurance #2: How AI Is Transforming Auto Insurance for Companies and Drivers, Brogan Woodburn, Rashawn Mitchner, dated Jun. 22, 2023. (Year: 2023).

STIC EIC Search Report for U.S. Appl. No. 18/196,691 (Year: 2024).

Wang et al., Transfer learning-based query classification for intelligent building information spoken dialogue. Automation in Construction. Sep. 1, 2022; 141:104403. (Year: 2022).

A. Wang N, Issa RR, Anumba CJ. Transfer learning-based query classification for intelligent building information spoken dialogue. Automation in Construction. Sep. 1, 2022; 141:104403. (Year: 2022).

ip.com NPL Search History (2025).

Mleczko, K. (2021). Chatbot as a tool for knowledge sharing in the maintenance and repair processes. Multidisciplinary Aspects of Production Engineering, 4(1), 499-508. (Year: 2021).

"Encrypt Team," "ChatGPT—AI Chat bot—A Complete Guide," www.theencrypt.com 2022 (Year: 2022).

Hossen et al., Controlling home appliances adopting chatbot using machine learning approach. In International Conference on Intelligent Computing & Optimization, pp. 253-264, Springer International Publishing (Oct. 2022).

Jadhav et al., "Design and Development of Chatbot Based on Reinforcement Learning," Chapter 12, https://doi.org/10.1002/9781119861850.ch12 2022 (Year: 2022).

Sankaranarayanan et al., Flood prediction based on weather parameters using deep learning, Journal of Water and Climate Change, 2020 (Year: 2020).

(56)         References Cited

OTHER PUBLICATIONS

Zhang et al., DIALOGPT : Large-Scale Generative Pre-training for Conversational Response Generation, A collaboration between Microsoft Research and Microsoft Dynamics 365 Al Research, pp. 270-278, Jul. 5-Jul. 10, 2020.

* cited by examiner

400

408

SAFE NAVIGATING

410

412

Warning:
Dangerous Location!

404

402

406

400

414

HOPE YOU HAD A SAFE TRIP!

Thanks for avoid following dangerous location(s)!

420

You are now eligible for a lower premium! Take it?

416

Yes, I'd love to!

418

Maybe next time...

600

900

902
RECEIVE LOCATION DATA
OF USER DEVICE

904
DETERMINE THAT USER IS
APPROACHING DESTINATION

906
LOAD A CRIME
DENSITY MAP

908
DETERMINE AT LEAST ONE
NON-CRIME-PRONE
PARKING SPOT

916
USER
ACCEPTED THE AT LEAST
ONE NON-CRIME-PRONE
PARKING SPOT?

NO

YES

920
DETERMINE A
SECOND ACTION

918
DETERMINE A
FIRST ACTION

— 1000

1000

1014

THANKS FOR USING SAFE PARKING!

Thanks for accepting the following parking location!

1030

You are now eligible for a lower premium! Take it?

1016

Yes, I'd love to!

1018

Maybe next time...

1200

METHOD AND SYSTEM FOR ALERTING USERS OF INCIDENT-PRONE LOCATIONS

CROSS-REFERENCE TO RELATED APPLICATIONS

This application claims priority to and the benefit of the filing date of (1) provisional U.S. Patent Application No. 63/525,051 entitled "METHOD AND SYSTEM FOR ALERTING USERS OF ACCIDENT-PRONE OR CRIME-PRONE LOCATIONS," filed on Jul. 5, 2023, and (2) provisional U.S. Patent Application No. 63/468,450 entitled "AI FOR ANALYZING ACCIDENT DENSITY," filed on May 23, 2023, the entire disclosure of each of which is hereby expressly incorporated herein by reference.

FIELD OF THE INVENTION

The present disclosure generally relates to methods and systems for alerting a user of crime-prone locations.

BACKGROUND

Today, digital maps of geographic areas are displayed on computing devices, such as computers, tablets, and mobile phones via mapping applications, web browsers, etc. Some digital maps may generate routes and provide step-by-step instructions from a user's starting location to a destination. Some digital maps may search for parking spots surrounding a particular location at the request of the user.

However, existing digital maps may fail to provide information regarding whether a location and/or a route is prone to accidents or crimes. Accidents and crimes are important to people's well-being. Conventionally, on some roads, there may be signs alerting people of accident-prone locations. However, such signs may provide alerts only when people are approaching the accident-prone location. The signs may not help people avoid such accident-prone locations. Further, there may not be signs for crime-prone locations. Conventionally, people rely on their memory and impression to avoid crime-prone locations. Such memory and impression may be subjective, not up-to-date, and inaccurate. The conventional techniques for alerting people of accident-prone and/or crime-prone locations may include additional ineffectiveness, inefficiencies, encumbrances, and/or other drawbacks.

SUMMARY

In one aspect, a computer-implemented method for alerting a user of accident-prone locations is provided. The method may be implemented via one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, ChatGPT-based bot, and/or other electronic or electrical components. For instance, in one example, the method may comprise: (1) receiving, by one or more processors and from a user device associated with the user, location data and motion data of the user device; (2) determining, by the one or more processors, based upon the motion data, that the user has started a trip; (3) loading, by the one or more processors, an accident density map surrounding a location of the user device based upon the location data; (4) determining, by the one or more processors, based upon the accident density map, at least one accident-prone location within a scope of the accident density map, wherein the at least one accident-prone location meets at least one predetermined criterion; and/or (5) presenting, by the one or more processors via the user device, an indication of the at least one accident-prone location. The method may include additional, fewer, or alternate actions, including those discussed elsewhere herein.

In another aspect, a computing system for alerting a user of accident-prone locations is provided. The computing system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT bots, and/or other electronic or electrical components, which may be in wired or wireless communication with one another. For example, in one instance, the computing system may include (i) one or more processors, and (ii) a non-transitory memory storing one or more instructions. The instructions, when executed by the one or more processors, cause the one or more processors to: (1) receive, from a user device associated with the user, location data and motion data of the user device; (2) determine, based upon the motion data, that the user has started a trip; (3) load an accident density map surrounding a location of the user device based upon the location data; (4) determine, based upon the accident density map, at least one accident-prone location within the scope of the accident density map, wherein the at least one accident-prone location meets at least one predetermined criterion; and/or (5) present, via the user device, an indication of the at least one accident-prone location. The computing system may include additional, less, or alternate functionality, including that discussed elsewhere herein.

In yet another aspect, a computer-readable medium is provided. For example, in one instance, the storing processor-executable may store instructions for alerting a user of accident-prone locations that, when executed by one or more processors, cause the one or more processors to (1) receive, from a user device associated with the user, location data and motion data of the user device; (2) determine, based upon the motion data, that the user has started a trip; (3) load an accident density map surrounding a location of the user device based upon the location data; (4) determine, based upon the accident density map, at least one accident-prone location within a scope of the accident density map, wherein the at least one accident-prone location meets at least one predetermined criterion; and/or (5) present, via the user device, an indication of the at least one accident-prone location. The computer-readable medium may include additional, less, or alternate functionality, including that discussed elsewhere herein.

In yet another aspect, a computer-implemented method for alerting a user of accident-prone locations is provided. The method may be implemented via one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, ChatGPT-based bot, and/or other electronic or electrical components. For instance, in one example, method may comprise: (1) determining, by one or more processors, a route from a starting location to a destination input by the user via a user device; (2) receiving, by the one or more processors from the user device, location data of the user device; (3) loading, by the one or more processors, an accident density map surrounding a location of the user device based upon the location data; (4) determining, by the one or more processors, based upon the location data and the accident density map, that the user device is approaching an accident-prone location along the route, wherein the accident-prone location that meets at least one predetermined criterion; (5) generating, by the one or more processors, at least one deviation route from the location of the user device to the destination, the deviation route excluding the accident-prone location; and/or (6) presenting, by the one or more processors via the user device, an indication of the at least one deviation route. The method may include additional, fewer, or alternate actions, including those discussed elsewhere herein.

In yet another aspect, a computing system for alerting a user of accident-prone locations is provided. The computing system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT bots, and/or other electronic or electrical components, which may be in wired or wireless communication with one another. For example, in one instance, the computing system may include (i) one or more processors, and (ii) a non-transitory memory storing one or more instructions. The instructions, when executed by the one or more processors, cause the one or more processors to: (1) determine a route from a starting location to a destination input by the user via a user device; (2) receive, from the user device, location data of the user device; (3) load an accident density map surrounding a location of the user device based upon the location data; (4) determine based upon the location data and the accident density map, that the user device is approaching an accident-prone location along the route, wherein the accident-prone location that meets at least one predetermined criterion; (5) generate at least one deviation route from the location of the user device to the destination, the deviation route excluding the accident-prone location; and/or (6) present, via the user device, an indication of the at least one deviation route. The computing system may include additional, less, or alternate functionality, including that discussed elsewhere herein.

In yet another aspect, a computer-readable medium is provided. For example, in one instance, the storing processor-executable may store instructions for alerting a user of accident-prone locations that, when executed by one or more processors, cause the one or more processors to (1) determine a route from a starting location to a destination input by a user via a user device; (2) receive, from the user device, location data of the user device; (3) load an accident density map surrounding a location of the user device based upon the location data; (4) determine based upon the location data and the accident density map, that the user device is approaching an accident-prone location along the route, wherein the accident-prone location that meets at least one predetermined criterion; (5) generate at least one deviation route from the location of the user device to the destination, the deviation route excluding the accident-prone location; and/or (6) present, via the user device, an indication of the at least one deviation route. The computer-readable medium may include additional, less, or alternate functionality, including that discussed elsewhere herein.

In yet another aspect, a computer-implemented method for alerting a user of accident-prone locations is provided. The method may be implemented via one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, ChatGPT-based bot, and/or other electronic or electrical components. For instance, in one example, method may comprise: (1) determining, by one or more processors, one or more routes from a starting location to a destination input by the user via a user device; (2) loading, by the one or more processors, an accident density map surrounding a location along the one or more routes; (3) selecting, by the one or more processors, at least one non-accident-prone route from the one or more routes, wherein the at least one non-accident-prone route meets at least one predetermined criterion; and/or (4) presenting, by the one or more processors via the user device, an indication of at least one non-accident-prone route. The method may include additional, fewer, or alternate actions, including those discussed elsewhere herein.

In yet another aspect, a computing system for alerting a user of accident-prone locations is provided. The computing system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT bots, and/or other electronic or electrical components, which may be in wired or wireless communication with one another. For example, in one instance, the computing system may include (i) one or more processors, and (ii) a non-transitory memory storing one or more instructions. The instructions, when executed by the one or more processors, cause the one or more processors to: (1) determine one or more routes from a starting location to a destination input by the user via a user device; (2) load an accident density map surrounding a location along the one or more routes; (3) select at least one non-accident-prone route from the one or more routes, wherein the at least one non-accident-prone route meets at least one predetermined criterion; and/or (4) present, via the user device, an indication of at least one non-accident-prone route. The computing system may include additional, less, or alternate functionality, including that discussed elsewhere herein.

In yet another aspect, a computer-readable medium is provided. For example, in one instance, the storing processor-executable may store instructions that, when executed by one or more processors, cause the one or more processors to (1) determine one or more routes from a starting location to a destination input by the user via a user device; (2) load an accident density map surrounding a location along the one or more routes; (3) select at least one non-accident-prone route from the one or more routes, wherein the at least one non-accident-prone route meets at least one predetermined criterion; and/or (4) present, via the user device, an indication of at least non-accident-prone one route. The computer-readable medium may include additional, less, or alternate functionality, including that discussed elsewhere herein.

In yet another aspect, a computer-implemented method for alerting a user of crime-prone locations is provided. The method may be implemented via one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, ChatGPT-based bot, and/or other electronic or electrical components. For instance, in one example, method may comprise: (1) receiving, by the one or more processors from a user device, location data of the user device; (2) determining, by the one or more processors, based upon the location data, that the user device is approaching a destination; (3) loading, by the one or more processors, a crime density map surrounding the destination; (4) determining, by the one or more processors based upon the crime density map, at least one non-crime-prone parking spot, wherein the at least one non-crime-prone parking spot meets at least one predetermined criterion; and/or (5) presenting, by the one or more processors via the user device, an indication of the at least one non-crime-prone parking spot. The method may include additional, fewer, or alternate actions, including those discussed elsewhere herein.

In another aspect, a computing system for alerting a user of crime-prone locations is provided. The computing system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT bots, and/or other electronic or electrical components, which may be in wired or wireless communication with one another. For example, in one instance, the computing system may include (i) one or more processors, and (ii) a non-transitory memory storing one or more instructions. The instructions, when executed by the one or more processors, cause the one or more processors to: (1) receive, from a user device, location data of the user device; (2) determine based upon the location data, that the user device is approaching a destination; (3) load a crime density map surrounding the destination; (4) determining, by the one or more processors based upon the crime density map, at least one non-crime-prone parking spot, wherein the at least one non-crime-prone parking spot meets at least one predetermined criterion; and/or (5) present, via the user device, an indication of the at least one non-crime-prone parking spot. The computing system may include additional, less, or alternate functionality, including that discussed elsewhere herein.

In yet another aspect, a computer-readable medium is provided. For example, in one instance, the storing processor-executable may store instructions that, when executed by one or more processors, cause the one or more processors to (1) receive, from a user device, location data of the user device; (2) determine based upon the location data, that the user device is approaching a destination; (3) load a crime density map surrounding the destination; (4) determining, by the one or more processors based upon the crime density map, at least one non-crime-prone parking spot, wherein the at least one non-crime-prone parking spot meets at least one predetermined criterion; and/or (5) present, via the user device, an indication of the at least one non-crime-prone parking spot. The computer-readable medium may include additional, less, or alternate functionality, including that discussed elsewhere herein.

In yet another aspect, a computer-implemented method for alerting a user of crime-prone locations is provided. The method may be implemented via one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, ChatGPT-based bot, and/or other electronic or electrical components. For instance, in one example, method may comprise: (1) receiving, by one or more processors from a user device, location data of the user device; (2) determining, by the one or more processors, based upon the location data, that the user has parked a vehicle in a particular location; (3) loading, by the one or more processors, a crime density map surrounding the particular location; (4) determining, by the one or more processors, based upon the crime density map, the particular location is a crime-prone location, wherein the crime-prone location meets at least one predetermined first criterion; (5) determining, by the one or more processors, based upon the crime density map, at least one non-crime-prone parking spot, wherein the non-crime-prone location meets at least one predetermined second criterion; and/or (6) presenting, by the one or more processors via the user device, an indication of at least one non-crime-prone parking spot. The method may include additional, fewer, or alternate actions, including those discussed elsewhere herein.

In another aspect, a computing system for alerting a user of crime-prone locations is provided. The computing system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT bots, and/or other electronic or electrical components, which may be in wired or wireless communication with one another. For example, in one instance, the computing system may include (i) one or more processors, and (ii) a non-transitory memory storing one or more instructions. The instructions, when executed by the one or more processors, cause the one or more processors to: (1) receive, from a user device, location data of the user device; (2) determine, based upon the location data, that the user has parked a vehicle in a particular location; (3) load a crime density map surrounding the particular location; (4) determine, based upon the crime density map, the particular location is a crime-prone location, wherein the crime-prone location meets at least one predetermined first criterion; (5) determine, based upon the crime density map, at least one non-crime-prone parking spot, wherein the non-crime-prone location meets at least one predetermined second criterion; and/or (6) present, via the user device, an indication of at least one non-crime-prone parking spot. The computing system may include additional, less, or alternate functionality, including that discussed elsewhere herein.

In yet another aspect, a computer-readable medium is provided. For example, in one instance, the storing processor-executable may store instructions that, when executed by one or more processors, cause the one or more processors to: (1) receive, from a user device, location data of the user device; (2) determine, based upon the location data, that the user has parked a vehicle in a particular location; (3) load a crime density map surrounding the particular location; (4) determine, based upon the crime density map, the particular location is a crime-prone location, wherein the crime-prone location meets at least one predetermined first criterion; (5) determine, based upon the crime density map, at least one non-crime-prone parking spot, wherein the non-crime-prone location meets at least one predetermined second criterion; and/or (6) present, via the user device, an indication of at least one non-crime-prone parking spot. The computer-readable medium may include additional, less, or alternate functionality, including that discussed elsewhere herein.

Additional, alternate and/or fewer actions, steps, features and/or functionality may be included in an aspect and/or embodiments, including those described elsewhere herein.

BRIEF DESCRIPTION OF THE DRAWINGS

The figures described below depict various aspects of the applications, methods, and systems disclosed herein. It should be understood that each figure depicts one embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

I. Exemplary Computing Environment

Figure 1:
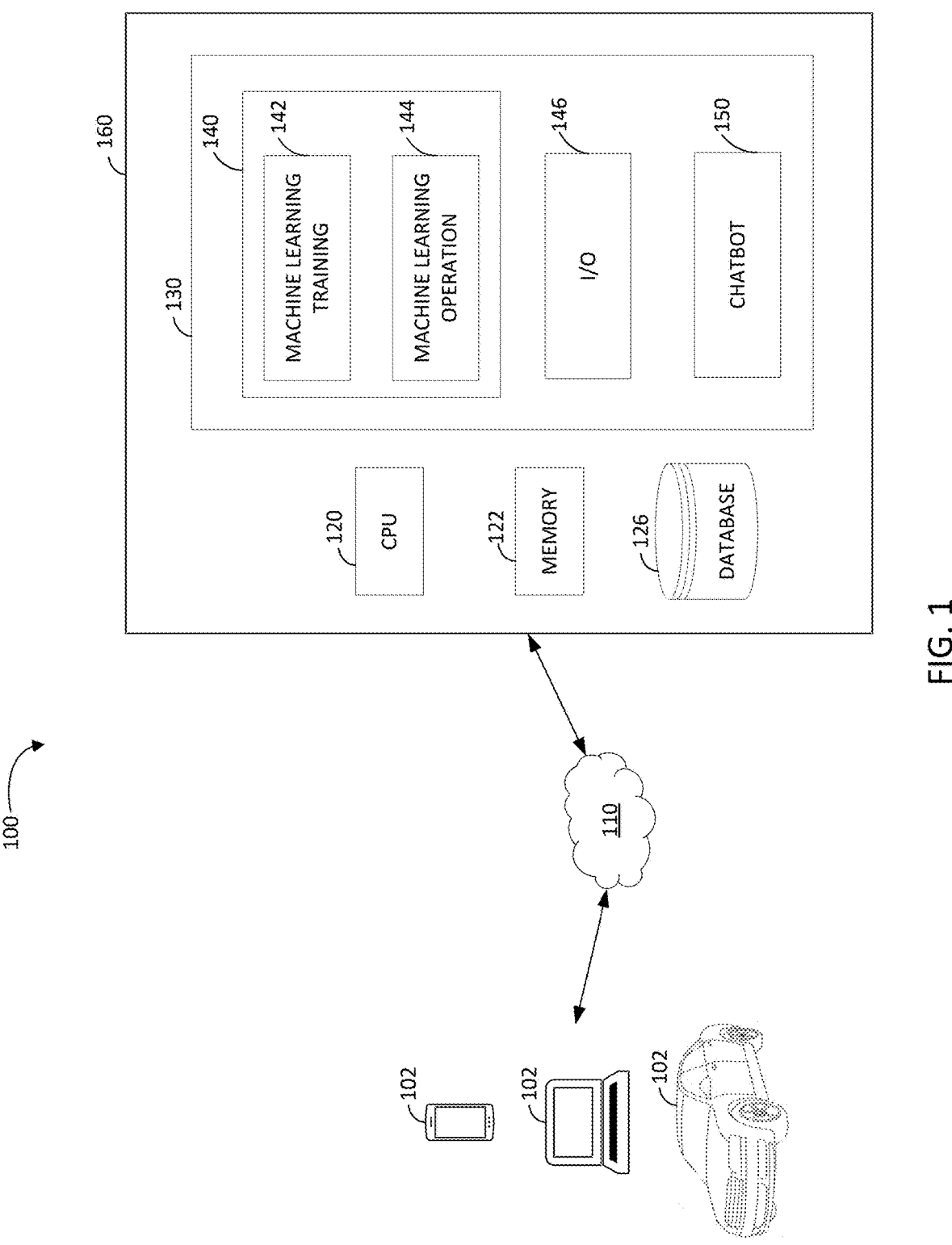
FIG. 1 depicts a block diagram of an exemplary computing system in which exemplary computer-implemented methods and systems for alerting a user of accident-prone or crime-prone locations are implemented according to one embodiment.

FIG. 1 depicts a block diagram of an exemplary computing environment 100 in which the method for alerting a user of accident-prone or crime-prone locations, in accordance with various aspects discussed herein.

In the exemplary aspect of FIG. 1, the computing environment 100 may include a user device 102. In various aspects, the user device 102 comprises one or more computing devices, which may comprise multiple, redundant, or replicated client computing devices accessed by one or more users. The computing environment 100 may further include an electronic network 110 communicatively coupling other aspects of the computing environment 100.

The user device 102 may be any suitable device, including one or more computers, mobile devices, navigation components in automobiles, wearables, smart watches, smart contact lenses, smart glasses, augmented reality glasses, virtual reality headsets, mixed or extended reality glasses or headsets, and/or other electronic or electrical component. The user device 102 may include a memory and a processor for, respectively, storing and executing one or more modules. The memory may include one or more suitable storage media such as a magnetic storage device, a solid-state drive, random access memory (RAM), etc. The user device 102 may access services or other components of the computing environment 100 via the network 110.

In one aspect, one or more servers 160 may perform the functionalities as part of a cloud network or may otherwise communicate with other hardware or software components within one or more cloud computing environments to send, retrieve, or otherwise analyze data or information described herein. For example, in certain aspects of the present techniques, the computing environment 100 may comprise an on-premise computing environment, a multi-cloud computing environment, a public cloud computing environment, a private cloud computing environment, and/or a hybrid cloud computing environment. For example, an entity (e.g., a business) providing a chatbot may host one or more services in a public cloud computing environment (e.g., Alibaba Cloud, Amazon Web Services (AWS), Google Cloud, IBM Cloud, Microsoft Azure, etc.). The public cloud computing environment may be a traditional off-premise cloud (i.e., not physically hosted at a location owned/controlled by the business). Alternatively, or in addition, aspects of the public cloud may be hosted on-premise at a location owned/controlled by an enterprise generating the customized code. The public cloud may be partitioned using visualization and multi-tenancy techniques and may include one or more infrastructure-as-a-service (IaaS) and/or platform-as-a-service (PaaS) services.

The network 110 may comprise any suitable network or networks, including a local area network (LAN), wide area network (WAN), Internet, or combination thereof. For example, the network 110 may include a wireless cellular service (e.g., 3G, 4G, 5G, 6G, etc.). Generally, the network 110 enables bidirectional communication between the user device 102 and the servers 160. In one aspect, the network 110 may comprise a cellular base station, such as cell tower(s), communicating to the one or more components of the computing environment 100 via wired/wireless communications based upon any one or more of various mobile phone standards, including NMT, GSM, CDMA, UMMTS, LTE, 5G, 6G, or the like. Additionally or alternatively, the network 110 may comprise one or more routers, wireless switches, or other such wireless connection points communicating to the components of the computing environment 100 via wireless communications based upon any one or more of various wireless standards, including by non-limiting example, IEEE 802.11a/b/c/g (WiFi), Bluetooth, and/or the like.

The processor 120 may include one or more suitable processors (e.g., central processing units (CPUs) and/or graphics processing units (GPUs)). The processor 120 may be connected to the memory 122 via a computer bus (not depicted) responsible for transmitting electronic data, data packets, or otherwise electronic signals to and from the processor 120 and memory 122 in order to implement or perform the machine-readable instructions, methods, processes, elements or limitations, as illustrated, depicted, or described for the various flowcharts, illustrations, diagrams, figures, and/or other disclosure herein. The processor 120 may interface with the memory 122 via a computer bus to execute an operating system (OS) and/or computing instructions contained therein, and/or to access other services/ aspects. For example, the processor 120 may interface with the memory 122 via the computer bus to create, read, update, delete, or otherwise access or interact with the data stored in the memory 122 and/or a database 126.

The memory 122 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 122 may store an operating system (OS) (e.g., Microsoft Windows, Linux, UNIX, etc.) capable of facilitating the functionalities, apps, methods, or other software as discussed herein.

The memory 122 may store a plurality of computing modules 130, implemented as respective sets of computer-executable instructions (e.g., one or more source code libraries, trained ML models such as neural networks, convolutional neural networks, etc.) as described herein.

In general, a computer program or computer-based product, application, or code (e.g., the model(s), such as ML models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 120 (e.g., working in connection with the respective operating system in memory 122) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang. Python, C, C++, C#, Objective-C, Java, Scala, ActionScript, JavaScript, HTML, CSS, XML, etc.).

The database 126 may be a relational database, such as Oracle, DB2, MySQL, a NoSQL based database, such as MongoDB, or another suitable database. The database 126 may store data and be used to train and/or operate one or more ML models, chatbots, and/or voice bots.

In one aspect, the computing modules 130 may include an ML module 140. The ML module 140 may include ML training module (MLTM) 142 and/or ML operation module (MLOM) 144. In some embodiments, at least one of a plurality of ML methods and algorithms may be applied by the ML module 140, which may include, but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, support vector machines and generative pre-trained transformers. In various embodiments, the implemented ML methods and algorithms are directed toward at least one of a plurality of categorizations of ML, such as supervised learning, unsupervised learning, and reinforcement learning.

In one aspect, the ML based algorithms may be included as a library or package executed on server(s) 160. For example, libraries may include the TensorFlow based library, the PyTorch library, a HuggingFace library, and/or the scikit-learn Python library.

In one embodiment, the ML module 140 may employ supervised learning, which involves identifying patterns in existing data to make predictions about subsequently received data. Specifically, the ML module is "trained" (e.g., via MLTM 142) using training data, which includes example inputs and associated example outputs. Based upon the training data, the ML module 140 may generate a predictive function which maps outputs to inputs and may utilize the predictive function to generate ML outputs based upon data inputs. The exemplary inputs and exemplary outputs of the training data may include any of the data inputs or ML outputs described above. In the exemplary embodiments, a processing element may be trained by providing it with a large sample of data with known characteristics or features.

In another embodiment, the ML module 140 may employ unsupervised learning, which involves finding meaningful relationships in unorganized data. Unlike supervised learning, unsupervised learning does not involve user-initiated training based upon example inputs with associated outputs. Rather, in unsupervised learning, the ML module 140 may organize unlabeled data according to a relationship determined by at least one ML method/algorithm employed by the ML module 140. Unorganized data may include any combination of data inputs and/or ML outputs as described above.

In yet another embodiment, the ML module 140 may employ reinforcement learning, which involves optimizing outputs based upon feedback from a reward signal. Specifically, the ML module 140 may receive a user-defined reward signal definition, receive a data input, utilize a decision-making model to generate the ML output based upon the data input, receive a reward signal based upon the reward signal definition and the ML output, and alter the decision-making model so as to receive a stronger reward signal for subsequently generated ML outputs. Other types of ML may also be employed, including deep or combined learning techniques.

The MLTM 142 may receive labeled data at an input layer of a model having a networked layer architecture (e.g., an artificial neural network, a convolutional neural network, etc.) for training the one or more ML models. The received data may be propagated through one or more connected deep layers of the ML model to establish weights of one or more nodes, or neurons, of the respective layers. Initially, the weights may be initialized to random values, and one or more suitable activation functions may be chosen for the training process. The present techniques may include training a respective output layer of the one or more ML models. The output layer may be trained to output a prediction, for example.

The MLOM 144 may comprise a set of computer-executable instructions implementing ML loading, configuration, initialization and/or operation functionality. The MLOM 144 may include instructions for storing trained models (e.g., in the electronic database 126). As discussed, once trained, the one or more trained ML models may be operated in inference mode, whereupon when provided with a de novo input that the model has not previously been provided, the model may output one or more predictions, classifications, etc., as described herein.

In one aspect, the computing modules 130 may include an input/output (I/O) module 146, comprising a set of computer-executable instructions implementing communication functions. The I/O module 146 may include a communication component configured to communicate (e.g., send and receive) data via one or more external/network port(s) to one or more networks or local terminals, such as the computer network 110 and/or the user device 102 (for rendering or visualizing) described herein. In one aspect, the servers 160 may include a client-server platform technology such as ASP.NET, Java J2EE, Ruby on Rails, Node.js, a web service or online API, responsive for receiving and responding to electronic requests.

The I/O module 146 may further include or implement an operator interface configured to present information to an administrator or operator and/or receive inputs from the administrator and/or operator. An operator interface may provide a display screen. The I/O module 146 may facilitate I/O components (e.g., ports, capacitive or resistive touch sensitive input panels, keys, buttons, lights, LEDs), which may be directly accessible via, or attached to, servers 160 or may be indirectly accessible via or attached to the user device 102. According to an aspect, an administrator or operator may 15 access the servers 160 via the user device 102 to review information, make changes, input training data, initiate training via the MLTM 142, and/or perform other functions (e.g., operation of one or more trained models via the MLOM 144).

In one aspect, the computing modules 130 may include one or more chatbots and/or voice bots 150 which may be programmed to simulate human conversation, interact with users, understand their needs, and recommend an appropriate line of action with minimal and/or no human intervention, among other things. This may include providing the best response of any query that it receives and/or asking follow-up questions. Although depicted as part of the server 160, a person of ordinary skill in the art may appreciate that chatbot 150 may not be comprised in the server 160. Rather, the chatbot may be implemented as an external component and work in connection with the server 160.

In some embodiments, the voice bots or chatbots 150 discussed herein may be configured to utilize AI and/or ML techniques. For instance, the voice bot or chatbot 150 may be a ChatGPT bot, an InstructGPT bot, a Codex bot, or a Google Bard bot. The voice bot or chatbot 150 may employ supervised or unsupervised ML techniques, which may be followed by, and/or used in conjunction with, reinforced or reinforcement learning techniques. The voice bot or chatbot 150 may employ the techniques utilized for ChatGPT, ChatGPT bot, InstructGPT bot, Codex bot, or Google Bard bot.

Noted above, in some embodiments, a chatbot 150 or other computing device may be configured to implement ML, such that server 160 "learns" to analyze, organize, and/or process data without being explicitly programmed. ML may be implemented through ML methods and algorithms. In one exemplary embodiment, the ML module 140 may be configured to implement ML methods and algorithms.

In operation, ML model training module 142 may access database 126 or any other data source for training data suitable to generate one or more ML models appropriate to receive and/or process the request for customized insurance policy, e.g., as part of an "ML chatbot." The training data may be sample data with assigned relevant and comprehensive labels (classes or tags) used to fit the parameters (weights) of an ML model with the goal of training it by example. In one aspect, once an appropriate ML model is trained and validated to provide accurate predictions and/or responses, the trained ML model may be loaded into MLOM 144 at runtime.

While various embodiments, examples, and/or aspects disclosed herein may include training and generating one or more chatbots 150 for the server 160 to load at runtime, it is also contemplated that one or more appropriately trained ML chatbots 150 may already exist (e.g., in database 126) such that the server 160 may load an existing trained chatbot 150 at runtime. It is further contemplated that the server 160 may retrain, update and/or otherwise alter an existing chatbot 150 before loading the model at runtime.

Although the computing environment 100 is shown to include one user device 102, one server 160, and one network 110, it should be understood that different numbers of user devices 102, networks 110, and/or servers 160 may be utilized. In one example, the computing environment 100 may include a plurality of servers 160 and hundreds or thousands of user devices 102, all of which may be interconnected via the network 110. Furthermore, the database storage or processing performed by the one or more servers 160 may be distributed among a plurality of servers 160 in an arrangement known as "cloud computing." This configuration may provide various advantages, such as enabling near real-time uploads and downloads of information as well as periodic uploads and downloads of information.

The computing environment 100 may include additional, fewer, and/or alternate components, and may be configured to perform additional, fewer, or alternate actions, including components/actions described herein. Although the computing environment 100 is shown in FIG. 1 as including one instance of various components such as user device 102, server 160, and network 110, etc., various aspects include the computing environment 100 implementing any suitable number of any of the components shown in FIG. 1 and/or omitting any suitable ones of the components shown in FIG. 1. For instance, information described as being stored at server database 126 may be stored at memory 122, and thus database 126 may be omitted. Moreover, various aspects include the computing environment 100 including any suitable additional component(s) not shown in FIG. 1, such as but not limited to the exemplary components described above. Furthermore, it should be appreciated that additional and/or alternative connections between components shown in FIG. 1 may be implemented. As just one example, server 160 and user device 102 may be connected via a direct communication link (not shown in FIG. 1) instead of, or in addition to, via network 110.

II. Exemplary Training of the ML Chatbot Model

An enterprise may be able to use programmable chatbots, such as the chatbot 150 and/or an ML chatbot (e.g., ChatGPT), to provide tailored, conversational-like customer service relevant to a line of business. The chatbot may be capable of understanding customer requests, providing relevant information, escalating issues, any of which may assist and/or replace the need for customer service assets of an enterprise. Additionally, the chatbot may generate data from customer interactions which the enterprise may use to personalize future support and/or improve the chatbot's functionality, e.g., when retraining and/or fine-tuning the chatbot.

The ML chatbot may provide advance features as compared to a non-ML chatbot. For example, the ML chatbot may include and/or derive functionality from a large language model (LLM). The ML chatbot may be trained on a server, such as server 160, using large training datasets of text which may provide sophisticated capability for natural-language tasks, such as answering questions and/or holding conversations. The ML chatbot may include a general-purpose pretrained LLM which, when provided with a starting set of words (prompt) as an input, may attempt to provide an output (response) of the most likely set of words that follow from the input. In one aspect, the prompt may be provided to, and/or the response received from, the ML chatbot and/or any other ML model, via a user interface of the server. This may include a user interface device operably connected to the server via an I/O module, such as the I/O module 146. Exemplary user interface devices may include a touchscreen, a keyboard, a mouse, a microphone, a speaker, a display, and/or any other suitable user interface devices.

Multi-turn (i.e., back-and-forth) conversations may require LLMs to maintain context and coherence across multiple user prompts and/or utterances, which may require the ML chatbot to keep track of an entire conversation history as well as the current state of the conversation. The ML chatbot may rely on various techniques to engage in conversations with users, which may include the use of short-term and long-term memory. Short-term memory may temporarily store information (e.g., in the memory 122 of the server 160) that may be required for immediate use and may keep track of the current state of the conversation and/or to understand the user's latest input in order to generate an appropriate response. Long-term memory may include persistent storage of information (e.g., on database 126 of the server 160) which may be accessed over an extended period of time. The long-term memory may be used by the ML chatbot to store information about the user (e.g., preferences, chat history, etc.) and may be useful for improving an overall user experience by enabling the ML chatbot to personalize and/or provide more informed responses.

The system and methods to generate and/or train an ML chatbot model which may be used the an ML chatbot, may include three steps: (1) a supervised fine-tuning (SFT) step where a pretrained language model (e.g., an LLM) may be fine-tuned on a relatively small amount of demonstration data curated by human labelers to learn a supervised policy (SFT ML model) which may generate responses/outputs from a selected list of prompts/inputs, where the SFT ML model may represent a cursory model for what may be later developed and/or configured as the ML chatbot model; (2) a reward model step where human labelers may rank numerous SFT ML model responses to evaluate the responses which best mimic preferred human responses, thereby generating comparison data. The reward model may be trained on the comparison data; and/or (3) a policy optimization step in which the reward model may further fine-tune and improve the SFT ML model. The outcome of this step may be the ML chatbot model using an optimized policy. In one aspect, step one may take place only once, while steps two and three may be iterated continuously, e.g., more comparison data is collected on the current ML chatbot model, which may be used to optimize/update the reward model and/or further optimize/update the policy. In some instances, the chatbot 150 may be trained by the server 160 (e.g., via the machine learning training module 142). In other instances, the chatbot 150 may be trained by other servers and/or computing devices.

A. Supervised Fine-Tuning ML Model

Figure 2:
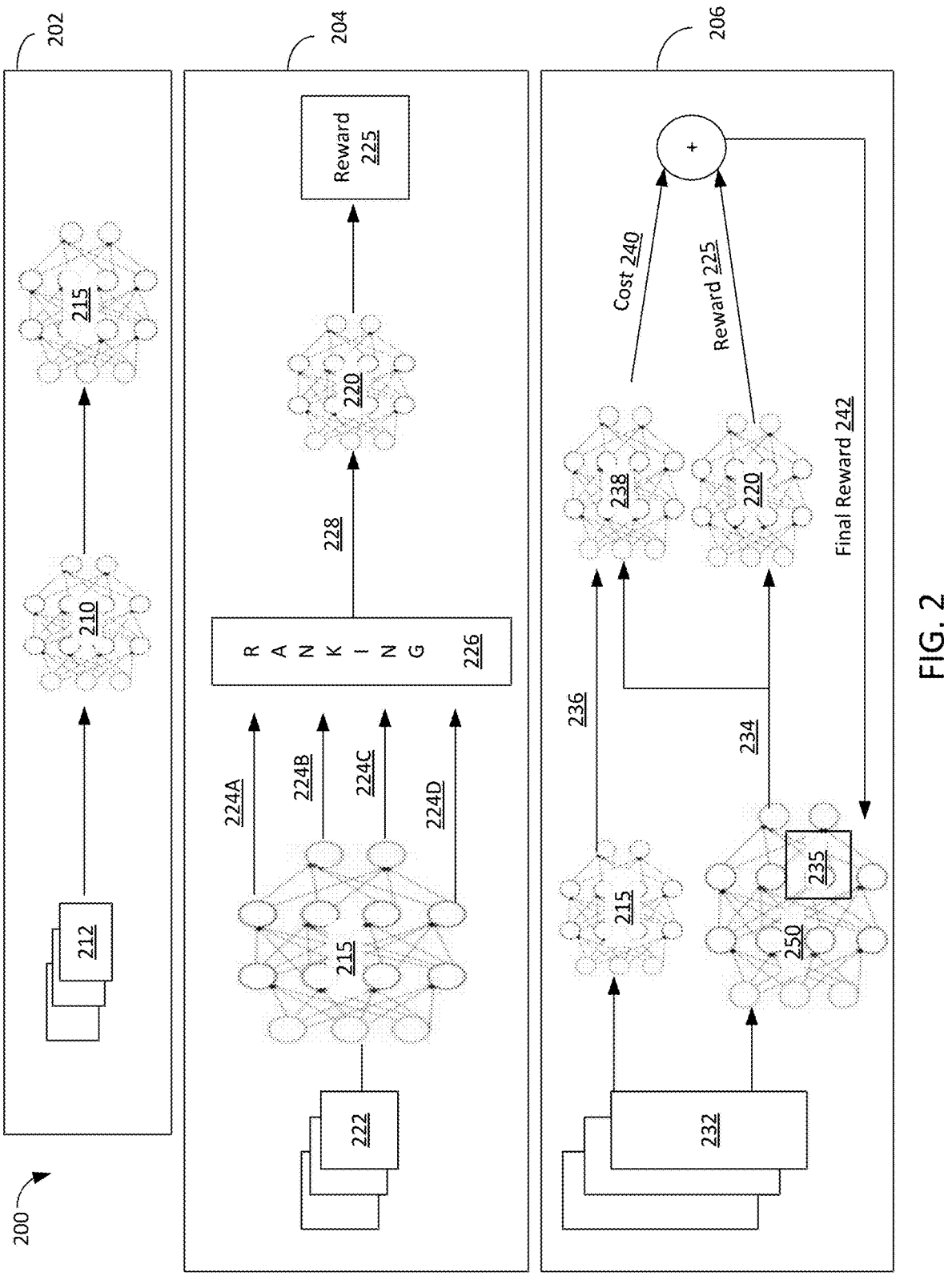
FIG. 2 depicts a combined block and logic diagram in which exemplary computer-implemented methods and systems for training an ML chatbot or an AI model are implemented according to one embodiment.

FIG. 2 depicts a combined block and logic diagram 200 for training an ML chatbot model, in which the techniques described herein may be implemented, according to some embodiments. Some of the blocks in FIG. 2 may represent hardware and/or software components, other blocks may represent data structures or memory storing these data structures, registers, or state variables (e.g., 212), and other blocks may represent output data (e.g., 225). Input and/or output signals may be represented by arrows labeled with corresponding signal names and/or other identifiers. The methods and systems may include one or more servers 202, 204, 206, such as the server 160 of FIG. 1.

In one aspect, the server 202 may fine-tune a pretrained language model 210. The pretrained language model 210 may be obtained by the server 202 and be stored in a memory, such as memory 122 and/or database 126. The pretrained language model 210 may be loaded into an ML training module, such as MLTM 142, by the server 202 for retraining/fine-tuning. A supervised training dataset 212 may be used to fine-tune the pretrained language model 210 wherein each data input prompt to the pretrained language model 210 may have a known output response for the pretrained language model 210 to learn from. The supervised training dataset 212 may be stored in a memory of the server 202, e.g., the memory 122 or the database 126. In one aspect, the data labelers may create the supervised training dataset 212 prompts and appropriate responses. The pretrained language model 210 may be fine-tuned using the supervised training dataset 212 resulting in the SFT ML model 215 which may provide appropriate responses to user prompts once trained. The trained SFT ML model 215 may be stored in a memory of the server 202, e.g., memory 122 and/or database 126.

In one aspect, the supervised training dataset 212 may include prompts and responses which may be relevant to generating an accident and/or crime density maps.

In one instance, the prompts for training may be prompts for generating accident/crime density maps and historical or hypothetical accident/crime data. The responses for training may be accident/crime density maps associated with the historical or hypothetical accident/crime data. At least at least a portion of the historical accident/crime data is at least one of an insurance claim document, an image, an audio, and/or a video associated with one or more accidents/crimes.

In one instance, the prompts for training may be prompts for generating scripts for generating accident/crime density maps using a density map generator and historical or hypothetical accident/crime data. The responses for training may be scripts for generating accident/crime density maps compliant for use by the map generator.

In one instance, the prompts for training may be prompts for generating scripts for data analysis using a particular software or coding language and historical or hypothetical accident/crime data. The responses for training may be scripts for data analysis (1) compliant for use by the particular software or (2) in the particular coding language.

B. Training the Reward Model

In one aspect, training the ML chatbot model 250 may include the server 204 training a reward model 220 to provide as an output a scaler value/reward 225. The reward model 220 may be required to leverage Reinforcement Learning with Human Feedback (RLHF) in which a model (e.g., ML chatbot model 250) learns to produce outputs which maximize its reward 225, and in doing so may provide responses which are better aligned to user prompts.

Training the reward model 220 may include the server 204 providing a single prompt 222 to the SFT ML model 215 as an input. The input prompt 222 may be provided via an input device (e.g., a keyboard) via the I/O module of the server, such as I/O module 146. The prompt 222 may be previously unknown to the SFT ML model 215, e.g., the labelers may generate new prompt data, the prompt 222 may include testing data stored on database 126, and/or any other suitable prompt data. The SFT ML model 215 may generate multiple, different output responses 224A, 224B, 224C, 224D to the single prompt 222. The server 204 may output the responses 224A, 224B, 224C, 224D via an I/O module (e.g., I/O module 146) to a user interface device, such as a display (e.g., as text responses), a speaker (e.g., as audio/voice responses), and/or any other suitable manner of output of the responses 224A, 224B, 224C, 224D for review by the data labelers.

The data labelers may provide feedback via the server 204 on the responses 224A, 224B, 224C, 224D when ranking 226 them from best to worst based upon the prompt-response pairs. The data labelers may rank 226 the responses 224A, 224B. 224C, 224D by labeling the associated data. The ranked prompt-response pairs 228 may be used to train the reward model 220. In one aspect, the server 204 may load the reward model 220 via the ML module (e.g., the ML module 140) and train the reward model 220 using the ranked response pairs 228 as input. The reward model 220 may provide as an output the scalar reward 225.

In one aspect, the scalar reward 225 may include a value numerically representing a human preference for the best and/or most expected response to a prompt, i.e., a higher scaler reward value may indicate the user is more likely to prefer that response, and a lower scalar reward may indicate that the user is less likely to prefer that response. For example, inputting the "winning" prompt-response (i.e., input-output) pair data to the reward model 220 may generate a winning reward. Inputting a "losing" prompt-response pair data to the same reward model 220 may generate a losing reward. The reward model 220 and/or scalar reward 236 may be updated based upon labelers ranking 226 additional prompt-response pairs generated in response to additional prompts 222.

In one example, a data labeler may provide to the SFT ML model 215 as an input prompt 222, "Describe the sky." The input may be provided by the labeler via the user device 102 over network 110 to the server 204 running a chatbot application utilizing the SFT ML model 215. The SFT ML model 215 may provide as output responses to the labeler via the user device 102: (i) "the sky is above" 224A; (ii) "the sky includes the atmosphere and may be considered a place between the ground and outer space" 224B; and (iii) "the sky is heavenly" 224C. The data labeler may rank 226, via labeling the prompt-response pairs, prompt-response pair 222/224B as the most preferred answer; prompt-response pair 222/224A as a less preferred answer; and prompt-response 222/224C as the least preferred answer. The labeler may rank 226 the prompt-response pair data in any suitable manner. The ranked prompt-response pairs 228 may be provided to the reward model 220 to generate the scalar reward 225.

While the reward model 220 may provide the scalar reward 225 as an output, the reward model 220 may not generate a response (e.g., text). Rather, the scalar reward 225 may be used by a version of the SFT ML model 215 to generate more accurate responses to prompts, i.e., the SFT model 215 may generate the response such as text to the prompt, and the reward model 220 may receive the response to generate a scalar reward 225 of how well humans perceive it. Reinforcement learning may optimize the SFT model 215 with respect to the reward model 220 which may realize the configured ML chatbot model 250.

C. RLHF to Train the ML Chatbot Model

In one aspect, the server 206 may train the ML chatbot model 250 (e.g., via the ML module 140) to generate a response 234 to a random, new and/or previously unknown user prompt 232. To generate the response 234, the ML chatbot model 250 may use a policy 235 (e.g., algorithm) which it learns during training of the reward model 220, and in doing so may advance from the SFT model 215 to the ML chatbot model 250. The policy 235 may represent a strategy that the ML chatbot model 250 learns to maximize its reward 225. As discussed herein, based upon prompt-response pairs, a human labeler may continuously provide feedback to assist in determining how well the ML chatbot's 250 responses match expected responses to determine rewards 225. The rewards 225 may feed back into the ML chatbot model 250 to evolve the policy 235. Thus, the policy 235 may adjust the parameters of the ML chatbot model 250 based upon the rewards 225 it receives for generating good responses. The policy 235 may update as the ML chatbot model 250 provides responses 234 to additional prompts 232.

In one aspect, the response 234 of the ML chatbot model 250 using the policy 235 based upon the reward 225 may be compared using a cost function 238 to the SFT ML model 215 (which may not use a policy) response 236 of the same prompt 232. The cost function 238 may be trained in a similar manner and/or contemporaneous with the reward model 220. The server 206 may compute a cost 240 based upon the cost function 238 of the responses 234, 236. The cost 240 may reduce the distance between the responses 234, 236, i.e., a statistical distance measuring how one probability distribution is different from a second, in one aspect the response 234 of the ML chatbot model 250 versus the response 236 of the SFT model 215. Using the cost 240 to reduce the distance between the responses 234, 236 may avoid a server over-optimizing the reward model 220 and deviating too drastically from the human-intended/preferred response. Without the cost 240, the ML chatbot model 250 optimizations may result in generating responses 234 which are unreasonable but may still result in the reward model 220 outputting a high reward 225.

In one aspect, the responses 234 of the ML chatbot model 250 using the current policy 235 may be passed by the server 206 to the rewards model 220, which may return the scalar reward 225. The ML chatbot model 250 response 234 may be compared via the cost function 238 to the SFT ML model 215 response 236 by the server 206 to compute the cost 240. The server 206 may generate a final reward 242 which may include the scalar reward 225 offset and/or restricted by the cost 240. The final reward 242 may be provided by the server 206 to the ML chatbot model 250 and may update the policy 235, which in turn may improve the functionality of the ML chatbot model 250.

To optimize the ML chatbot 250 over time, RLHF via the human labeler feedback may continue ranking 226 responses of the ML chatbot model 250 versus outputs of earlier/other versions of the SFT ML model 215, i.e., providing positive or negative rewards 225. The RLHF may allow the servers (e.g., servers 204, 206) to continue iteratively updating the reward model 220 and/or the policy 235. As a result, the ML chatbot model 250 may be retrained and/or fine-tuned based upon the human feedback via the RLHF process, and throughout continuing conversations may become increasingly efficient.

Although multiple servers 202, 204, 206 are depicted in the exemplary block and logic diagram 200, each providing one of the three steps of the overall ML chatbot model 250 training, fewer and/or additional servers may be utilized and/or may provide the one or more steps of the ML chatbot model 250 training. In one aspect, one server may provide the entire ML chatbot model 250 training.

III. Alerting Users of Accident-Prone Locations

A. First Embodiment

Figure 3:
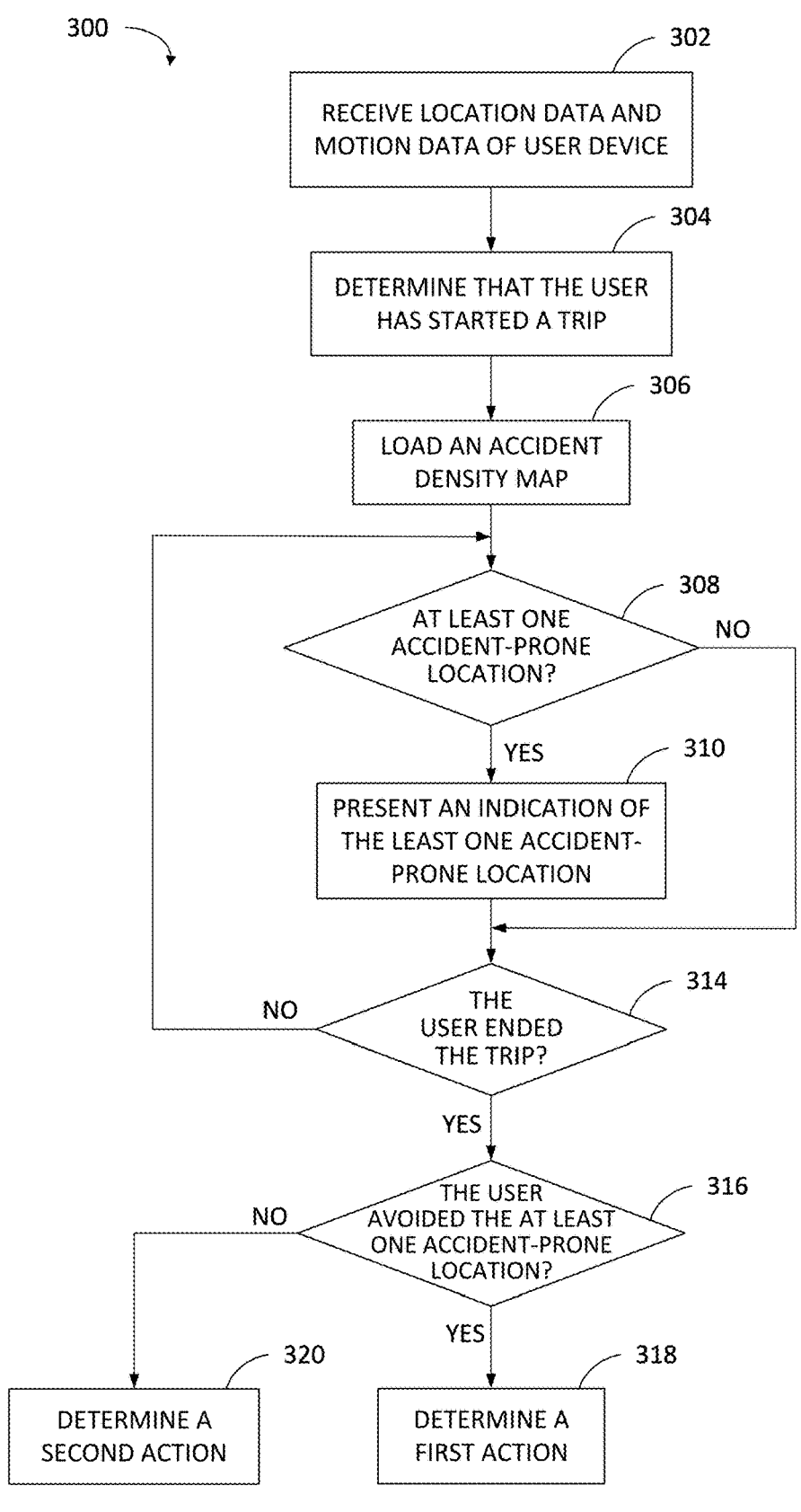
FIG. 3 depicts flow diagram of exemplary computer-implemented methods for alerting a user of accident-prone locations according to a first embodiment.

FIG. 3 depicts a flow diagram of an exemplary computer-implemented method 300 for alerting users of accident-prone locations according to a first embodiment described herein.

The method 300 may begin at block 302 when a server 160 receives location data and motion data from a user device 102. The location data may be a location coordinate determined by a Global Positioning System (GPS) module of the user device. The motion data may include a speed, a moving direction, and/or an acceleration of the user device 102 determined by sensors (e.g., a gyroscope, an accelerometer, and/or a compass) of the user device 102.

At block 304, the server 160 may determine that the user has started a trip based upon the motion data. For example, the server 160 may determine that the user has started a trip when the user device 102 has been changing locations continuously for a predetermined time period (e.g., one minute, five minutes, etc.). Additionally, the server 160 may refrain from determining the user has started a trip if there is a discontinuous change of the location of the user device 102, and/or the acceleration of the user device 102 exceeds a predetermined threshold, because a discontinuous change of location and/or abnormally high acceleration may indicate the change of location is caused by inaccurate GPS signals. In some instances, the user device 102 may access data of the user's automobile. In such instances, the server may receive automobile data from the user device 102, and determine that the user has started the trip based upon the automobile data. For example, the server 160 may determine that the user has started the trip when the automobile data indicates the gear has been switched to "Drive." Further, the server 160 may determine a type of the user's trip (such as walking or driving) based upon the speed of the user device 102 and adjust the alerts to the user accordingly as will be described herein below.

At block 306, upon determining that the user has started a trip, the server 160 may load an accident density map within a predetermined scope surrounding a current location of the user device 102. The predetermined scope may depend on a speed of the user device 102 or a type of the user's trip. For example, the scope of the map being loaded may be positively correlated to the user's speed. In another example, the scope of the map being loaded when the user is driving may be bigger than the scope when the user is walking. Upon loading the accident density map, the server 160 may transmit the accident density map to the user device 102 so that the accident density map may be presented to the user.

The accident density map may be generated by Artificial Intelligence (AI) and/or Machine Learning (ML) technologies. More particularly, the accident density map may be generated by an AI or ML chatbot, such as chatbot 150.

In some instances, the server 160 may transmit a prompt for generating an accident density map to a chatbot 150 to cause the chatbot 150 to generate the accident density map. To this end, the chatbot may be trained with prompts for generating accident density maps, accident density maps, and historical or hypothetical accident data associated with the plurality of accident density maps as described herein above.

In other instances, the accident density map may be generated by a chatbot 150 in connection with a density map generator. More specifically, responsive to a request for generating an accident density map, the server may transmit to the chatbot 150 a prompt for generate a script for generating the accident density map, the script being compliant for use by a density map generator. For instance, the script may be formatted in accordance with an Application Programming Interface (API) of the density map generator. In one example, the density map generator may be a software capable of generating density or heat maps, such as MatLab® or R Studio®. In this scenario, the script may be commands for generating density or heat maps executable by the software. In another example, the density map generator may be a working environment (e.g., an Integrated Development Environment (IDE)) for a particular coding language, such as C++, Java, or Python, etc. In this scenario, the script may be code for generating density or heat maps in the particular coding language. Upon the script being generated, the server 160 may transmit the script and historical accident data to cause the density map generator to generate the accident density map. In both examples, the script may further cause the density map generator to generate an accident density map that shows one or more metrics of accidents distributed on the accident density map, such as frequencies of the accidents, types of the accidents, danger levels of the accidents, and/or other metrics disclosed herein. In some scenarios, the historical accident data may be in a non-standardized format, such as an accident report in handwriting. The server 160 may transform the data to a standardized format, such as a digital data format, by performing Optical Character Recognition (OCR) and/or other computer vision techniques.

Upon all data being digitalized, the server 160 may analyze the data for the purpose of generating the accident density map. In one example, the server 160 may employ machine learning or artificial techniques to perform the data analysis. In another example, the server 160 may cause a chatbot 150 to generate (i) a script compliant for use by software capable of analyzing data (e.g., Microsoft Excel®, Numbers®) or (ii) code for data analysis, and analyze the data by (1) inputting the script to the software or (2) by executing the code. Although not depicted in the figures, a person of ordinary skill in the art may appreciate that the map generator may be implemented as a module comprised in the server 160. Alternatively, the map generator may be external to the server 160 and may work in connection with the server 160. Further, the generation of the accident density map may be performed by the server 160, or another server.

A person of ordinary skill in the art may appreciate that the training of the chatbot 150 may be performed by the server 160 or another server. Additionally, a person of ordinary skill in the art may appreciate that although block 306 is shown as a one-time step in FIG. 3, it may be performed periodically or performed every time the user device changes locations to a certain extent. A person of ordinary skill in the art may further appreciate that although block 306 is shown in series with blocks 308 and 310, block 306 may be performed in parallel with blocks 308 and 310.

At block 308, the server 160 may determine whether at least one location within the scope of the accident density map is an accident-prone location, wherein the accident-prone location meets at least one predetermined criterion. In some instances, the at least one predetermined criterion may be based upon one or more metrics, including: (1) a distance between the at least one accident-prone location and the location of the user device is less than a predetermined distance threshold, (2) a frequency of accidents associated with the at least one accident-prone location is higher than a predetermined frequency threshold, (3) a type of accidents associated with the at least one accident-prone location falls within an accident type group, (4) a danger level of accidents associated with the at least one accident-prone location is higher than a predetermined danger level. (5) a recency of a latest accident associated with the at least one accident-prone location is greater than a predetermined recency threshold, (6) a similarity between a current weather and a weather associated with a time of an accident associated with the at least one accident-prone location is greater than a predetermined similarity threshold, and/or (7) any combination thereof.

The predetermined distance threshold may depend on a speed of the user device 102 or a type of the user's trip. For example, the predetermined distance threshold for a user walking with a low speed is smaller than that for a user driving with a high speed. The accident type group may include a collision between automobiles, a collision between an automobile and a pedestrian, and/or a collision between an automobile and a nearby structure. The danger level of the accidents associated with the at least one location may be indicated by seriousness of personal injuries and/or property damages associated with the accidents. The time of an accident associated with the at least one accident-prone location may be a most frequent time of accidents associated with the at least one accident-prone location. In some instances, the at least one predetermined criterion may be a probability of accidents determined based upon historical accident data using a machine learning (ML) and/or artificial intelligence (AI) model. In other instances, the at least one predetermined criterion may be a damage expectation or an adjusted damage expectation determined based upon the probability of accidents. The damage expectation may be a sum of products of probabilities associated with accidents and damages associated respective crimes, i.e., $\Sigma_i$ P(accident$_i$)×damage$_i$, where P(accident$_i$) represents a probability that the particular accident occurs, and damage; represents an estimated damage (e.g., personal injuries, property damages, etc.) associated with the particular accident. The adjusted damage expectation may be a weighted sum of probabilities associated with accidents and damages associated respective crimes, i.e., $\Sigma_i k_i$×P(accident$_i$)×damage$_i$, where $k_i$ represents a weight assigned to a particular accident, P(accident$_i$) represents a probability that the particular accident occurs, and damage; represents an estimated damage (e.g., personal injuries, property damages, etc.) associated with the particular accident.

At block 310, responsive to determining that at least one location is an accident-prone location, the server 160 may transmit an indication of the at least one location to the user device 102 or otherwise present the location to the user. The indication may include the location, a typical type of accidents associated with the at least one location, and/or a most recent accident associated with the at least one location. The indication may be presented to the user in a warning format. In some instances, a type of the warning to the user may be determined by a type of the user trip. For example, if the server 160 determines that the user is driving, the warning may be non-interactive and disappear automatically after a certain time period. In another example, if the server 160 determines that the user is walking, the warning may be interactive and disappear only after the user confirms the notification by interacting with a GUI (described below) implementing the method. Moreover, the server 160 may select locations for presenting warnings from the at least one location based upon the user's moving direction and projected route as will be described below.

At block 314, the server 160 may determine that the user has ended trip based upon the motion data. For example, the server 160 may determine that the user has ended the trip when the user device 102 has been staying at particular location continuously for a predetermined time period (e.g., one minute, five minutes, etc.). Further, the server 160 may determine that the user has ended the trip based upon a user profile and/or a type of the current location of the user device 102. For example, if the user device 102 has been staying in a location marked as "home" in the user's profile for a certain period of time, the server 160 may determine that the user has ended the trip. The certain time period may be shorter than the predetermined time period for locations not included in the user's profile. In another example, if the user device 102 has been staying in location marked as a popular destination, the server 160 may determine that the user has ended the trip when the user device 160 has been staying at the location for a certain time period. The certain time period may be shorter than the predetermined time period for locations not marked as popular destinations. A popular destination may be a public parking lot, a mall, a restaurant, a park, and/or other popular places that people would like to visit. The server 160 may mark locations as popular destination based upon big data analysis and/or utilize a machine learning model trained for this purpose.

In some instances, the user device 102 may access data of the user's automobile. In such instances, the server 160 may receive automobile data from the user device 102, and determine that the user has ended the trip based upon the automobile data. For example, the server 160 may determine that the user has ended the trip when the automobile data indicates the gear has been switched to "Park."

A person of ordinary skill in the art may appreciate that although blocks 308 and 314 are presented in series, these two blocks may be performed in parallel and do not depend on each other.

At block 316, after the user ended the trip, the server 160 may determine whether the user avoided the at least one accident-prone location based upon the route recorded during the trip. At block 318, responsive to determining that the user avoided the at least one accident-prone location, the server 160 may determine a first insurance-related action. The first insurance-related action may include maintaining a current insurance policy for the user, decreasing an insurance premium for the user, and/or decreasing an insurance coverage for the user. At block 320, responsive to determining that the user avoided the at least one accident-prone location, the server 160 may determine a second insurance-related action. The second insurance-related action may include maintaining a current insurance policy for the user, increasing an insurance premium for the user, and/or increasing an insurance coverage for the user.

The server 160 may further determine whether the user took a deviation to avoid the at least one accident-prone location. Responsive to determining that the user took a deviation to avoid the at least one accident-prone location, the server 160 may determine a third insurance-related action. The third insurance-related action may include maintaining current insurance policy for the user, decreasing an insurance premium for the user, and/or decreasing an insurance coverage for the user. The user may interact with the GUI (described below) to accept or reject the first, second, and/or third insurance-related actions as will be described below.

Additionally or alternatively, the server 160 may receive real-time data associated with a real-time accident. A real-time accident may be a real-time collision between automobiles, a real-time collision between an automobile and a pedestrian, etc. The server 160 may determine whether the real-time data meets at least one predetermined criterion. The at least one predetermined criterion may be based upon one or more metrics, including a distance between the location of the user device and a location of the real-time accident, a type of the real-time accident, an impact scope of the real-time accident, an impact level of the real-time accident, a reporting time of the real-time accident, an expected impact duration of the real-time accident, and/or an expected impact end time of the real-time accident. Upon determining that the real-time accident meets the at least one predetermined criterion, the server 160 may present, via the user device 102, an indication of a location associated with the real-time accident to the user in a similar manner as described above with respect to block 310. The server 160 may then perform blocks 314-320 with respect to the location associated with the real-time accident in a similar manner as described above with respect to the at least one accident-prone location.

Figure 4A:
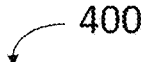
FIGS. 4A-4C depict exemplary displays of an enterprise mobile application implementing the method for alerting a user of accident-prone locations according to the first embodiment.
Figure 4A:
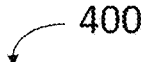

FIG. 4A depicts an exemplary Graphical User Interface (GUI) 400 for an enterprise mobile application (app) implementing a method for alerting users of accident-prone locations described herein according to the first embodiment. The app may be executed on a user device 102 communicating with a server 160 via a network 110.

Upon starting the application, the user device 102 may display a first thread, such as "SAFE NAVIGATING" 408, on the screen, to indicate that a safe navigation mode is on and the application is tracking the user's locations.

Upon loading an accident density map 410 surrounding a current location of the user device 102, the user device 102 may display the accident density map 410 on the screen. The user device 102 may also display the user's current location on the accident density map 410 with a symbol 402. The symbol 402 may indicate a moving direction of the user.

On the accident density map 410, one or more accident-prone locations 404, 406 may be displayed. One or more metrics of the accident-prone locations 404, 406 may be indicated, e.g., by sizes of the symbols for the accident-prone locations, by colors of the symbols for the accident-prone locations, by shapes of the symbols for the accident-prone locations, and/or other suitable ways. For example, the accident-prone location 406 may be associated with more historical accidents than the accident-prone location 404. To show such differences, the symbol for the accident-prone location 406 may be bigger than the symbol for the accident-prone location 404. Alternatively or additionally, the symbol for the accident-prone location 406 may use a color with higher contrast with respect to the map than the color of the accident-prone location 404.

Further, conspicuousness of the symbols of the accident-prone locations may be adjusted based upon the user's moving direction. For example, the symbol for accident-prone location 406 may become less conspicuous as the user is moving away, e.g., by increasing a transparency of the symbol, by decreasing a contrast of the color of the symbol with respect to the accident density map, and/or by other suitable ways to make the symbol less conspicuous. Conversely, the symbol for accident-prone location 404 may become more conspicuous as the user is moving closer, e.g., by decreasing a transparency of the symbol, by increasing a contrast of the color of the symbol with respect to the accident density map, and/or by other suitable ways to make the symbol more conspicuous.

Figure 4B:
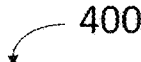

Turning to FIG. 4B, when a user is approaching an accident-prone location 404, the user device 102 may display a warning 412 to the user. The server 160 may determine whether to present a warning 412 with respect to an accident-prone location based upon one or more metrics of the accident-prone location as described herein above with respect to block 308. For example, the server 160 may determine to present a warning on a location with an accident frequency exceeding a predetermined frequency threshold. Further, the server 160 may determine whether to present a warning 412 with respect to an accident-prone location based upon a moving direction of the user device 102 and a projected route. For example, in the scenario shown in FIG. 4B, the user is moving toward location 404 along a road. The server 160 may present a warning with respect to location 404 accordingly. Conversely, the user is moving away from location 406 along a road, that is, although an absolute distance between the user and location 406 may be decreasing along the user's moving direction, the user's projected route would not lead the user to move toward location 406. Accordingly, the server 160 may determine not to present a warning of location 406, even though the location 406 may be perceived more "dangerous" than location 404 according to the one or more metrics described herein above.

Figure 4C:
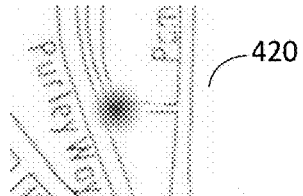

Turning to FIG. 4C, upon determining that the user has ended the trip, the user device 102 may display a second thread, such as "HOPE YOU HAD A SAFE TRIP" 414, to indicate the safe navigation mode is off and the application stops tracking the user's locations. In the event that the server 160 determines the user avoided the accident-prone locations during the trip, the user device 102 may present the accident-prone locations 420 that the user avoided on the screen. Further, the server 160 may determine the user avoided an accident-prone location only if the accident-prone location was on the user's projected route during the trip. For example, in the scenario shown in FIG. 4B, location 404 is on the user's projected route, but location 406 is not. In the event that the server 160 determines a first, second, and/or third insurance-related actions as described herein, the user device 102 may present such actions to the user such that the user may accept (e.g., by interacting with icon 416) or reject (e.g., by interacting with icon 418) the actions.

B. Second Embodiment

Figure 5:
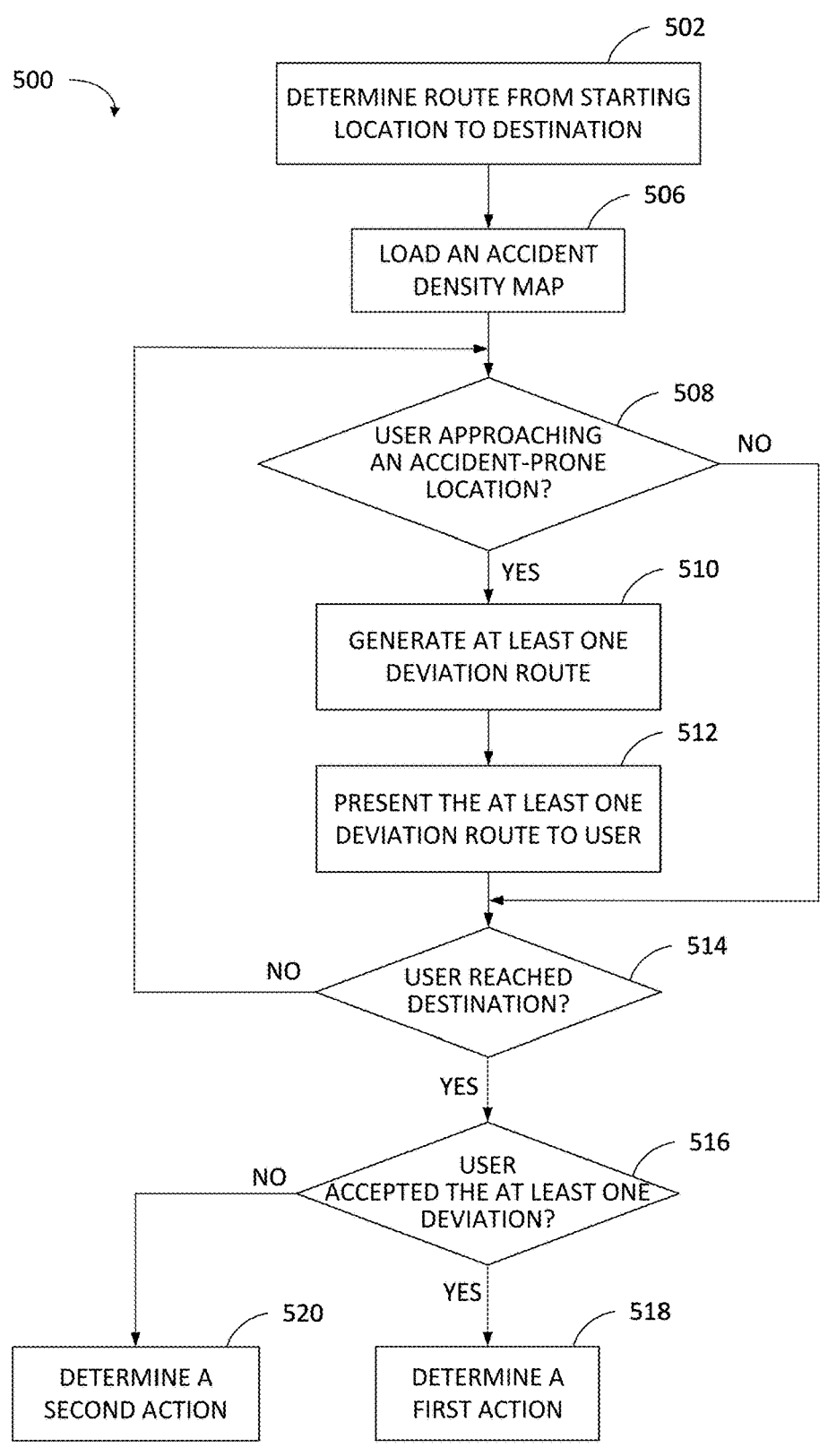
FIG. 5 depicts flow diagram of exemplary computer-implemented methods for alerting a user of accident-prone locations according to a second embodiment.

FIG. 5 depicts a flow diagram of an exemplary computer-implemented method 500 for alerting users of accident-prone locations according to a second embodiment described herein.

The method 500 may begin when a user inputs a starting location and a destination to begin a trip. At block 502, the server 160 may determine a route from the starting location to the destination as input by the user. The server 160 may determine the route based upon an expected travel time and/or the user's preferences (e.g., avoid highways, avoid tolls, etc.).

In some instances, the server 160 may receive location data of the user device 102 in a similar manner as described herein above with respect to block 302. At block 506, the server 160 may load an accident density map surrounding a current location of the user device 102 in a similar manner as described above with respect to block 306. In other instances, at block 506, the server 160 may load an accident density map surrounding the route. The accident density map may be generated in a similar manner as described herein above with respect to the first embodiment.

At block 508, the server 160 may determine whether the user is approaching, along the route, an accident-prone location that meets at least one predetermined criterion. The at least one predetermined criterion may include the criteria as described above with respect to block 308.

At block 510, responsive to determining that the user is approaching an accident-prone location along the route, the server 160 may generate at least one deviation route. In some instances, the at least one deviation route does not include accident-prone locations. In other instances, the at least one deviation route only include locations associated with a lower damage expectation and/or adjusted damage expectation than the accident-prone location as determined in a similar manner as described herein above with respect to block 308.

At block 512, the server 160 may present the at least one deviation route to the user via the user device 102.

At block 514, the server 160 may determine whether the user has reached the destination. To this end, the server 160 may determine a distance between a current location of the user device and the destination. If the distance is lower than a predetermined threshold, the server 160 may determine that the user has reached the destination.

At block 516, the server 160 may determine whether the user accepted the at least one deviation route during the trip. In some instances, the server 160 may determine that the user accepted the at least one deviation based upon the user's actual route during the trip by tracking locations of the user device 102. In other instances, the server 160 may determine that the user accepted the at least one deviation based upon the user's interaction with a GUI (described below).

A person of ordinary skill in the art may appreciate that although blocks 514 and 516 are presented in series, these two blocks may be performed in parallel and do not depend on each other. That is, the server 160 may perform block 516 during the trip and before determining that the user reached the destination.

At block 518, responsive to determining that the user accepted the at least one deviation route, the server 160 may determine a first insurance-related action as described herein above with respect to block 318. At block 520, responsive to determining that the user rejected the at least one deviation route, the server 160 may determine a second insurance-related action as described herein above with respect to block 320.

Additionally or alternatively, the server 160 may receive real-time data associated with a real-time accident as described herein above with respect to the first embodiment. The server 160 may determine whether the real-time data meets at least one predetermined criterion as described herein above with respect to the first embodiment. Upon determining that the real-time accident meets at least one predetermined criterion, the server may display an indication of a location associated with the real-time accident to the user in a similar manner as described herein above with respect to block 310. The server 160 may then perform blocks 514-520 with respect to the location associated with the real-time accident in a similar manner as described herein above with respect to the accident-prone location.

Figure 6A:
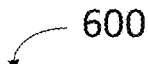
FIGS. 6A-6B depict exemplary displays of an enterprise mobile application implementing the method for alerting a user of accident-prone locations according to the second embodiment.
Figure 6A:
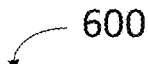

FIG. 6A depicts an exemplary GUI 600 for an enterprise mobile application (app) implementing a method for alerting users of accident-prone locations described herein according to the second embodiment. The app may be executed on a user device 102 communicating with a server 160 via a network 110.

The user device 102 may display a first thread 608, an accident density map 610, a current location of the user device 602, one or more accident-prone locations 604, 606 in a similar manner as described herein above with respect to FIG. 4A. The user device 102 may further display a starting location 612 and a destination 614 on the map. The starting location 612 and the destination 614 may be presented with different symbols.

Upon determining a route from the starting location to the destination as input by the user as described herein with respect to block 502, the server may transmit the route to the user device. The user device may display the route as a main route 616.

When the user is approaching, along the route, an accident-prone location that meets at least one predetermined criterion (such as location 606), the server 160 may generate a deviation route as described herein with respect to blocks 510. The user device 102 may display the deviation route 618 via the GUI 600. The main route 616 and the deviation route 618 may be displayed in different colors and/or other different manners.

Figure 6B:
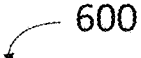

Turning to FIG. 6B, during the trip, the server 160 may determine whether the user accepted the deviation route 618 in a manner as described herein above with respect to block 516. Upon determining that the user accepted the deviation route, the server 160 may generate a new route 620 by incorporating the deviation route 618 into the main route 616. The user device may display the new route 620 via the GUI 600.

Upon determining that the user has reached the destination, the user device 102 may display a second thread, the accident-prone locations avoided by the user, if any, and/or insurance-related actions on the GUI 600 in a similar manner as described herein with respect to FIG. 4C.

C. Third Embodiment

Figure 7:
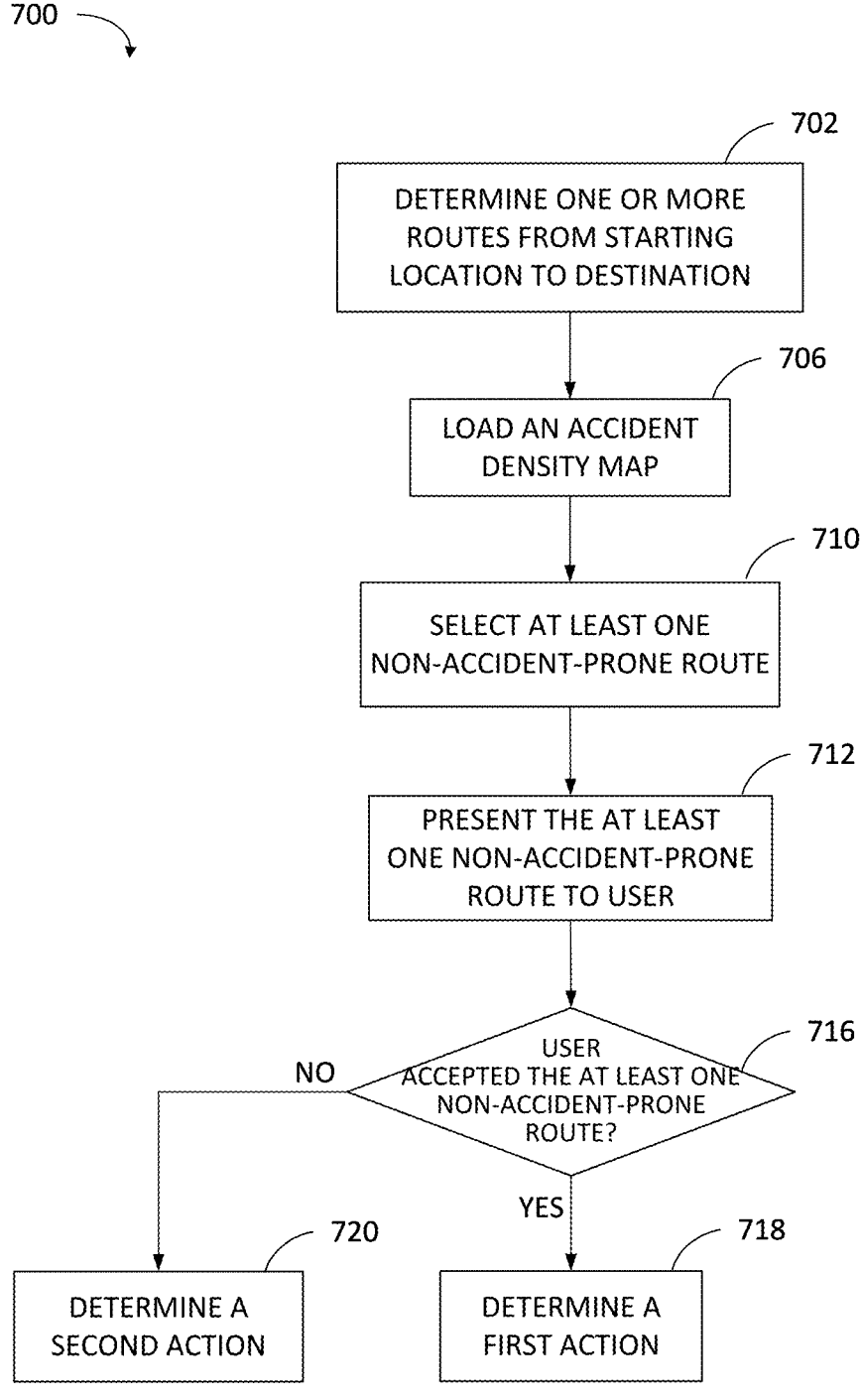
FIG. 7 depicts flow diagram of exemplary computer-implemented methods for alerting a user of accident-prone locations according to a third embodiment.

FIG. 7 depicts a flow diagram of an exemplary computer-implemented method 700 for alerting users of accident-prone locations according to a third embodiment described herein.

The method 700 may begin when a user inputs a starting location and a destination to begin a trip. At block 702, the server 160 may determine one or more routes from the starting location to the destination in a similar manner as described herein above with respect to block 502. At block 706, the server 160 may load an accident map surrounding the one or more routes. The accident density map may be generated in a similar manner as described herein above with respect to the first embodiment.

At block 710, the server 160 may select at least one non-accident-prone route from the one or more routes, wherein the at least one non-accident-prone route meets at least one predetermined criterion. In some instances, the at least one criterion may be that the at least one route does not include accident-prone locations. The accident-prone locations may be determined in a similar manner as described herein above with respect to block 308. In other instances, at least one criterion may be that the at least one route is associated with a lowest damage expectation and/or adjusted damage expectation among the one or more routes as determined in a similar manner described herein above with respect to block 308.

At block 712, the server 160 may present the at least one non-accident-prone route to the user via the user device 102 in a similar manner as described herein above with respect to block 512.

At block 716, the server 160 may determine whether the user accepted the at least one route in a similar manner as described herein above with respect to block 516.

At block 718, responsive to determining that the user accepted the at least one route, the server 160 may determine a first insurance-related action as described herein above with respect to block 518. At block 720, responsive to determining that the user rejected the at least one route, the server 160 may determine a second insurance-related action as described herein above with respect to block 720.

Figure 8:
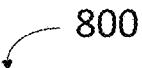
FIG. 8 depicts exemplary displays of an enterprise mobile application implementing the method for alerting a user of accident-prone locations according to the third embodiment.

FIG. 8 depicts an exemplary GUI 800 an enterprise mobile application (app) implementing a method for alerting users of accident-prone locations described herein according to the third embodiment. The app may be executed on a user device 102 communicating with a server 160 via a network 110.

The user device 102 may display a first thread 808, an accident density map 810, a current location of the user device 802, one or more accident-prone locations 804, 806, a starting location 812, and a destination 814 in a similar manner as described herein above with respect to FIG. 6A.

Upon determining one or more routes from the starting location to the destination input by the user as described herein with respect to block 702, the server 160 may transmit the one or more routes to the user device 102. The user device 102 may display the one or more routes 816, 818 via the GUI 800. The server 160 may then select at least one route from the one or more routes as described herein with respect to blocks 708, 710, and transmit the selected route(s) to the user device 102. The user device 102 may display the selected route(s) 816 as "Recommended" 820.

Upon determining that the user has reached the destination, the user device 102 may display a second thread, the accident-prone locations avoided by the user, if any, and/or insurance-related actions on the GUI 800 in a similar manner as described herein with respect to FIG. 4C.

IV. Alerting Users of Crime-prone Locations

A. First Embodiment

Figure 9:
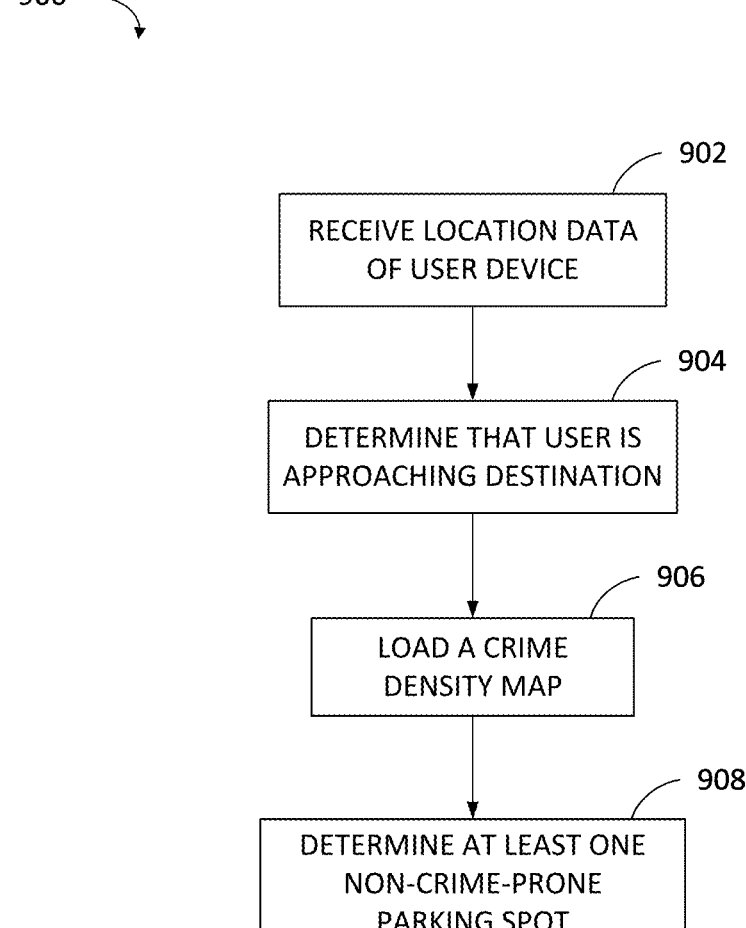
FIG. 9 depicts flow diagram of exemplary computer-implemented methods for alerting a user of crime-prone locations according to a first embodiment.

FIG. 9 depicts a flow diagram of an exemplary computer-implemented method 900 for alerting users of crime-prone locations according to a first embodiment described herein.

The method 900 may begin at block 902 when a server 160 receives location data from a user device 102. The location data may be a location coordinate determined by a Global Positioning System (GPS) module of the user device 102. In some instances, the server 160 may also receive motion data from the user device 102. The motion data may include a speed, a moving direction, and/or an acceleration of the user device 102 determined by sensors (e.g., a gyroscope, an accelerometer, and/or a compass) of the user device 102.

At block 904, the server 160 may determine that the user is approaching a destination as input by the user in a similar manner as described herein above with respect to block 514.

At block 906, the server 160 may load a crime density map. In some instances, the server 160 may load a crime density map surrounding the destination. In other instances, the server 160 may load a crime density map surrounding a current location of the user device 102.

The crime density map may be generated by Artificial Intelligence (AI) and/or Machine Learning (ML) technologies. More particularly, the crime density map may be generated by an AI or ML chatbot, such as chatbot 150.

In some instances, the server 160 may transmit a prompt for generating a crime density map to the chatbot 150 to cause the chatbot to generate the crime density map. To this end, the chatbot 150 may be trained with prompts for generating crime density maps, crime density maps, and historical or hypothetical crime data associated with the plurality of crime density maps as described herein above.

In other instances, the crime density map may be generated by a chatbot 150 in connection with a density map generator. More specifically, responsive to a request for generating a crime density map, the server 160 may transmit to the chatbot 150 a prompt for generate a script for generating the crime density map, the script being compliant for use by a density map generator. For instance, the script may be formatted in accordance with an Application Programming Interface (API) of the density map generator. In one example, the density map generator may be a software capable of generating density or heat maps, such as Mat-Lab® or R Studio®. In this scenario, the script may be commands for generating density or heat maps executable by the software. In another example, the density map generator may be a working environment (e.g., an Integrated Development Environment (IDE)) for a particular coding language, such as C++, Java, or Python, etc. In this scenario, the script may be code for generating density or heat maps in the particular coding language. Upon the script being generated, the server 160 may transmit the script and historical crime data to cause the density map generator to generate the crime density map. In both examples, the script may further cause the density map generator to generate a crime density map that shows one or more metrics of crimes distributed on the crime density map, such as frequencies of the crimes, types of the crimes, danger levels of the crimes, and/or other metrics disclosed herein. In some scenarios, the historical crime data may be in a non-standardized format, such as a crime report in handwriting. The server 160 may transform the data to a standardized format, such as a digital data format, by performing Optical Character Recognition (OCR) and/or other computer vision techniques. Upon all data being digitalized, the server 160 may analyze the data for the purpose of generating the crime density map.

In one example, the server 160 may employ machine learning or artificial techniques to perform the data analysis. In another example, the server 160 may cause a chatbot 150 to generate (i) a script compliant for use by software capable of analyzing data (e.g., Microsoft Excel®, Numbers®) or (ii) code for data analysis, and analyze the data by (1) inputting the script to the software or (2) by executing the code. Although not depicted in the figures, a person of ordinary skill in the art may appreciate that the map generator may be implemented as a module comprised in the server 160. Alternatively, the map generator may be external to the server 160 and may work in connection with the server 160. Further, the generation of the crime density map may be performed by the server 160, or another server.

A person of ordinary skill in the art may appreciate that the training of the chatbot 150 may be performed by the server 160 or another server.

At block 908, the server 160 may determine at least one non-crime-prone parking spot, wherein the at least one non-crime-prone parking spot meets at least one predetermined criterion. In some instances, the at least one predetermined criterion may be based upon one or more metrics, including: (1) a distance between a location of the at least one non-crime-prone parking spot and the destination is less than a predetermined distance threshold. (2) a frequency of crimes associated with the at least one non-crime-prone parking spot is lower than a predetermined frequency threshold, (3) a type of crimes associated with the at least one non-crime-prone parking spot does not fall within a predetermined crime type group, (4) a danger level of crimes associated with the at least one non-crime-prone parking spot is lower than a predetermined danger level, (5) a recency of a latest crime associated with the at least one non-crime-prone parking spot is less than a predetermined recency threshold, (6) a similarity between a current time and a time of a crime associated with the at least one non-crime-prone parking spot and is lower than a predetermined first similarity threshold, (7) a similarity between a current economic index and an economic index associated with a time of a crime associated with the at least one non-crime-prone parking spot is lower than a predetermined second similarity threshold, and/or (8) any combination thereof.

The predetermined crime type group may include robbery, vandalism, carjacking, and/or other serious crimes. The danger level of the crimes associated with the at least one location may be indicated by seriousness of personal injuries and/or property damages or losses associated with the crimes. The time of a crime associated with the at least one crime-prone location may be a most frequent time of crimes associated with the at least one crime-prone location. In some instances, the at least one predetermined threshold may be a probability of crimes determined based upon historical crime data using a machine learning (ML) and/or artificial intelligence (AI) model. In other instances, the at least one predetermined threshold may be a damage expectation or an adjusted damage expectation determined based upon the probability of crimes. The damage expectation may be a sum of products of probabilities associated with crimes and damages associated respective crimes, i.e., $\Sigma_i P(\text{crime}_i) \times \text{damage}_i$, where $P(\text{crime}_i)$ represents a probability that the particular crime occurs, and damage; represents an estimated damage (e.g., personal injuries, property damages, etc.) associated with the particular crime. The adjusted damage expectation may be a weighted sum of probabilities associated with crimes and damages associated respective crimes, i.e., $\Sigma_i k_i \times P(\text{crime}_i) \times \text{damage}_i$, where $k_i$ represents a weight assigned to a particular crime, $P(\text{crime}_i)$ represents a probability that the particular crime occurs, and damage; represents an estimated damage (e.g., personal injuries, property losses, etc.) associated with the particular crime.

At block 916, the server 160 may determine whether the user accepted the at least one parking spot. In some instances, the server 160 may determine that the user accepted the at least one parking spot based upon the user's actions, i.e., whether the user moved the automobile to the at least one parking spot and parked the automobile there based upon the location data and/or motion data of the user device 102. In other instances, the server 160 may determine that the user accepted the at least one parking spot based upon the user's interaction with the indication of the at least one parking spot via a GUI (described below).

At block 918, responsive to determining that the user accepted the at least one parking spot, the server 160 may determine a first insurance-related action. The first insurance-related action may include maintaining a current insurance policy for the user, decreasing an insurance premium for the user, and/or decreasing an insurance coverage for the user. At block 920, responsive to determining that the user rejected the at least one parking spot, the server 160 may determine a second insurance-related action. The second insurance-related action may include maintaining a current insurance policy for the user, increasing an insurance premium for the user, and/or increasing an insurance coverage for the user.

Additionally or alternatively, the server 160 may receive real-time data associated with a real-time crime. The server 160 may determine whether the real-time data meets at least one predetermined criterion. The at least one predetermined criterion may include a distance between the location of the user device and a location of the real-time crime, a type of the real-time crime, an impact scope of the real-time crime, an impact level of the real-time crime, a reporting time of the real-time crime, an expected impact duration of the real-time crime, and/or an expected impact end time of the real-time crime. Upon determining that the real-time crime meets the at least one predetermined criterion, the server 160 may present an indication of a location associated with the real-time crime to the user in a similar manner as described below with respect to displaying crime-prone locations.

Figure 10A:
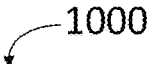
FIGS. 10A-10B depict exemplary displays of an enterprise mobile application implementing the method for alerting a user of crime-prone locations according to the first embodiment.

FIG. 10A depicts an exemplary Graphical User Interface (GUI) 1000 for an enterprise mobile application (app) implementing a method for alerting users of crime-prone locations described herein according to the first embodiment. The app may be executed on a user device 102 communicating with a server 160 via a network 110.

Upon starting the application, the user device 102 may display a first thread, such as "SAFE PARKING" 1008, on the screen, to indicate that a safe parking mode is on and the application is tracking the user's locations.

Upon loading a crime density map 1010, the user device 102 may display the crime density map 1010 via the GUI 1000. The user device 102 may also display the user's current location on the crime density map 1010 with a symbol 1002. The symbol 1002 may indicate a moving direction of the user.

On the crime density map 1010, one or more crime-prone locations 1004, 1006 may be displayed. One or more metrics of the crime-prone locations 1004, 1006 may be indicated in a similar manner as described herein above with respect to symbols 404, 406. Further, conspicuousness of the symbols of the crime-prone locations may be adjusted based upon the user's moving direction in a similar manner as described herein above with respect to symbols 404, 406.

One or more parking spots 1016, 1018, 1020 close to the destination 1014 may also be displayed. The server 160 may select at least one non-crime-prone parking spot as described herein above with respect to block 908. The user device 102 may display the selected parking spots 1016, 1018 in a different manner than the unselected parking spot 1020. More particularly, the selected parking spots 1016, 1018 may be displayed more conspicuously than unselected parking spot 1020, for example by using a color of a higher contrast with the map 1010, by using a symbol of a greater size, and/or other appropriate manners.

The user may accept the selected parking spots 1016, 1018 by interacting with the icons of parking spots 1016, 1018 via the GUI 1000. The user may interact with the icons by touching the icons the GUI 1000 or in other appropriate manners. Alternatively, the server 160 may determine that the user accepted the at least one parking spot based upon whether the user moved the automobile to the at least one parking spot as described herein above with respect to block 916.

Figure 10B:
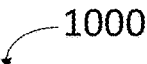

Turning to FIG. 10B, upon determining that the user has parked the automobile, the user device 102 may display a second thread, such as "THANKS FOR USING SAFE PARKING!" 1014, to indicate the safe parking mode is off and the application stops tracking the user's locations. In the event that the server 160 determines the user accepted the selected parking spots, the user device 102 may present the accepted parking spot 1030 on the screen. In the event that the server 160 determines a first or second insurance-related actions as described herein, the user device 102 may present the actions to the user such that the user may accept (e.g., by interacting with icon 1016) or reject (e.g., by interacting with icon 1018) the actions.

B. Second Embodiment

Figure 11:
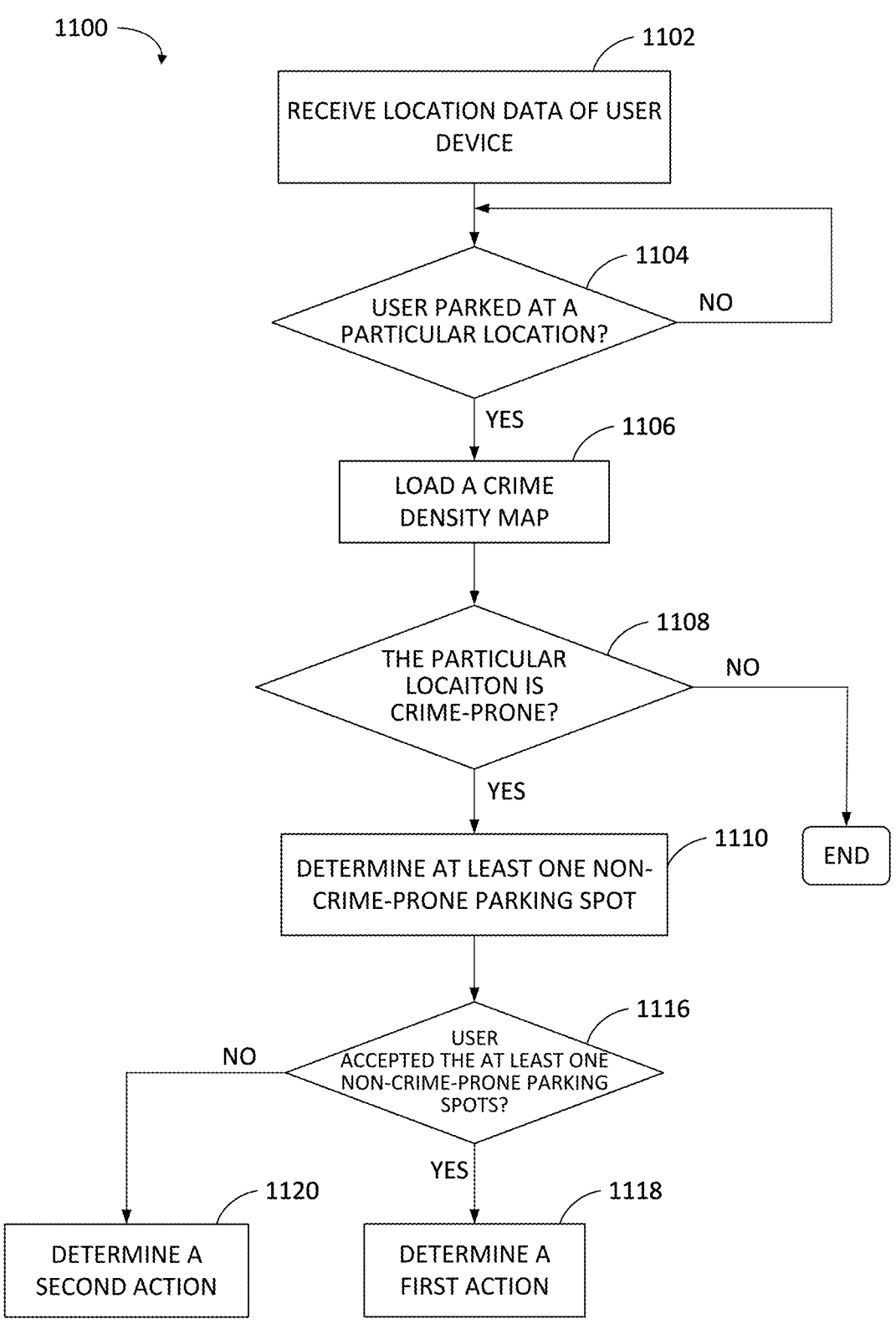
FIG. 11 depicts flow diagram of exemplary computer-implemented methods for alerting a user of crime-prone locations according to a second embodiment.

FIG. 11 depicts a flow diagram of an exemplary computer-implemented method 1100 for alerting users of crime-prone locations according to a second embodiment described herein.

The method 1100 may begin at block 1102 when a server 160 receives location data from a user device 102 in a similar manner as described herein above with respect to block 902.

At block 1104, the server 160 may determine whether the user has parked an automobile at a particular location. For example, the server 160 may determine that the user has parked at a particular location when the user device 102 has been staying at the particular location continuously for a predetermined time period (e.g., one minute, five minutes, etc.). Further, the server 160 may determine that the user has parked at a particular location based upon a user profile and/or a type of a current location of the user device 102. For example, if the user device 102 has been staying in a location marked as "home" in the user's profile, the server 160 may determine that the user has parked the automobile when the user device 102 has been staying at the location for a certain time period. The certain time period may be shorter than the predetermined time period for locations not included in the user's profile. In another example, if the user device 102 has been staying in a location marked by the server 160 as a popular destination, the server 160 may determine that the user has parked the automobile when the user device 102 has been staying at the location for a certain time period. The certain time period may be shorter than the predetermined time period for locations of other types. The popular destination may include a public parking lot, a mall, a restaurant, a park, and/or other popular places that people would like to visit. The server 160 may mark locations as popular destination based upon big data analysis and/or utilize a machine learning model trained for this purpose. In yet another example, the server 160 may determine that the user has parked at a particular location when the speed of the user device 102 has been about zero at the particular location, and the user device 102 then moves at a low speed, e.g., a regular speed for walking.

In some instances, the user device 102 may access data of the user's automobile. In such instances, the server 160 may receive automobile data from the user device, and determine that the user has parked the automobile based upon the automobile data. For example, the server 160 may determine that the user has parked the automobile when the automobile data indicates the gear has been switched to "Park." Responsive to determining that the user has not parked the automobile, the server continues to perform block 1104.

Responsive to determining that the user has parked the automobile at the particular location, at block 1106, the server 160 may load a crime density map in a similar manner as described herein above with respect to block 906.

At block 1108, the server 160 may determine whether the particular location is a crime-prone location, wherein the crime-prone location meets at least one predetermined first criterion. In some instances, the at least one predetermined first criterion may include similar criteria as described herein above with respect to block 908.

Responsive to determining that the particular location is a crime-prone location, at block 1110, the server 160 may determine at least one non-crime-prone parking spot, wherein the at least one non-crime-prone parking spot meets at least one predetermined second criterion. In some instances, the at least one predetermined second criterion includes that the at least one non-crime-prone parking spot is not a crime-prone location as determined according to the at least one predetermined first criterion. In other instances, the at least one predetermined second criterion includes that the non-crime-prone parking spot is associated with a lower damage expectation and/or adjusted damage expectation than the particular location. In both instances, the at least one predetermined second criterion may include that the at least one non-crime-prone parking spot is within a certain distance from the particular location.

At block 1116, the server 160 may determine whether the user accepted the at least one non-crime-prone parking spot in a similar manner as described herein above with respect to block 916. Responsive to determining that the user accepted the at least one non-crime-prone parking spot, at block 1118, the server 160 may determine a first insurance-related action in a similar manner as described herein above with respect to block 918. Responsive to determining that the user rejected the at least one non-crime-prone parking spot, at block 1120, the server 160 may determine a second insurance-related action in a similar manner as described herein above with respect to block 920.

Figure 12A:
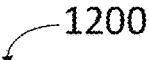
FIGS. 12A-12B depict exemplary displays of an enterprise mobile application implementing the method for alerting a user of crime-prone locations according to the second embodiment.

FIG. 12A depicts an exemplary Graphical User Interface (GUI) 1200 for an enterprise mobile application (app) implementing a method for alerting users of crime-prone locations described herein according to the second embodiment. The app may be executed on a user device 102 communicating with a server 160 via a network 110.

The user device 102 may display a first thread 1208, a crime density map 1210, and/or one or more crime-prone locations 1204, 1206 in a similar manner as described herein above with respect to FIG. 10A.

Upon determining that the user has parked a vehicle at a particular location, the user device 102 may display the particular location 1220 via the GUI 1200. The user device 102 may further display a thread to show this particular location 1220 more conspicuously, such as "YOU PARKED HERE" 1212.

Figure 12B:
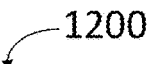

Turning to FIG. 12B, upon determining at least one non-crime-prone parking spot as described herein above with respect to block 1110, the user device 102 may display the at least one non-crime-prone parking spot 1216, 1218 via the GUI 1200.

The user device 102 may further display an alert, such as an alert window 1230. The alert may suggest that the user parked at a crime-prone location. The alert may also recommend the at least one non-crime-prone parking spot to the user. To this end, the user device may display the at least one non-crime-prone parking spot 1216, 1218 in a conspicuous manner. For example, the user device 102 may display circles 1222, 1224 surrounding the icons for the non-crime-prone parking spot 1216, 1218. In other examples, the user device 102 may display the recommended parking spots in a color of a high contrast to the map, display the recommended parking spots with big symbols, display the recommended parking spots with flashing symbols, and/or in other appropriate manners.

In some instances, the user device 102 may further display interactable icons 1232, 1234. The user may accept the recommended parking spots by interacting with icon 1232 ("Yes, I'll go there."). The user may reject the recommended parking spots by interacting with icon 1234 ("No, I'll take the risk.").

In the event that the server 160 determines the user accepted one of the recommended parking spots, the user device 102 may present the accepted parking spot on the screen in a similar manner as described herein above with respect to FIG. 10B. In the event that the server 160 determines a first or second insurance-related actions as described herein, the user device 102 may present the actions to the user such that the user may accept or reject in a similar manner as described herein above with respect to FIG. 10B.

C. Additional Embodiments

In other embodiments, the method for alerting a user of crime-prone locations may be implemented in a similar manner as described herein above with respect to the embodiments of the method for alerting a user of accident-prone locations.

In one aspect, a computer-implemented method for alerting a user of crime-prone locations is provided. The method may be implemented via one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, ChatGPT-based bot, and/or other electronic or electrical components. For instance, in one example, the method may comprise: (1) receiving, by one or more processors and from a user device associated with the user, location data and motion data of the user device; (2) determining, by the one or more processors, based upon the motion data, that the user has started a trip; (3) loading, by the one or more processors, an crime density map surrounding a location of the user device based upon the location data; (4) determining, by the one or more processors based upon the crime density map, at least one crime-prone location within a scope of the crime density map, wherein the at least one crime-prone location meets at least one predetermined criterion; and/or (5) presenting, by the one or more processors via the user device, an indication of the at least one crime-prone location. The method may include additional, fewer, or alternate actions, including those discussed elsewhere herein.

In some instances, the method further comprises: (1) determining, by the one or more processors, based upon the motion data, that the user has ended the trip; (2) determining, by the one or more processors, whether the user avoided the at least one crime-prone location; (3) responsive to determining the user avoided the at least one crime-prone location, determining, by the one or more processors, a first insurance-related action; and/or (4) responsive to determining the user traveled through the at least one crime-prone location, determining, by the one or more processors, a second insurance-related action.

In some instances, the first insurance-related action is at least one of maintaining a current insurance policy for the user, decreasing an insurance premium for the user, and/or decreasing an insurance coverage for the user.

In some instances, the second insurance-related action is at least one of maintaining a current insurance policy for the user, increasing an insurance premium for the user, and/or increasing an insurance coverage for the user.

In some instances, the method further comprises: (1) responsive to determining that the user avoided the at least one crime-prone location, determining, by the one or more processors, whether the user took a deviation to avoid the at least one crime-prone location; and/or (2) responsive to determining that the user took the deviation to avoid the at least one crime-prone location, determining a third insurance-related action.

In some instances, the crime density map is generated by a chatbot, the chatbot being trained with a plurality of training crime density maps and historical or hypothetical crime data associated with the plurality of training crime density maps.

In some instances, the crime density map is generated by: (1) receiving a prompt for generating an crime density map; (2) transmitting the prompt to the chatbot to generate a script for generating the crime density map, the script compliant for use by a density map generator; and/or (3) transmitting, to the density map generator, the script and historical crime data to cause the density map generator to generate the crime density map.

In some instances, transmitting, to the density map generator, the script and the historical crime data to generate the crime density map includes: transmitting, to the density map generator, the script and the historical crime data to cause the density map generator to generate the crime density map that shows at least one of frequencies of crimes distributed on the crime density map, types of crimes distributed on the crime density map, and/or danger levels of crimes distributed on the crime density map.

In some instances, the chatbot is trained with a plurality of prompts for creating crime density maps, and a plurality of scripts for generating the crime density maps compliant for use by the density map generator.

In some instances, at least a portion of the historical crime data is at least one of an insurance claim document, an image, an audio, and/or a video associated with one or more crimes.

In some instances, the motion data includes at least one of a speed of the user device, a direction of the user device, and/or an acceleration of the user device.

In some instances, the at least one predetermined criterion includes similar criteria as described herein above with respect to block 908.

In some instances, the method further comprises: (1) receiving, by the one or more processors, real-time crime data associated with a real-time crime; (2) determining, by the one or more processors, whether the real-time crime data meets at least one predetermined second criterion; and/or (3) responsive to determining that real-time crime meets the at least one predetermined second criterion, presenting, by the one or more processors via the user device, an indication of the real-time crime.

In some instances, the at least one predetermined second criterion includes at least one of a distance between the location of the user device and a location of the real-time crime, a type of the real-time crime, an impact scope of the real-time crime, an impact level of the real-time crime, a reporting time of the real-time crime, an expected impact duration of the real-time crime, and/or an expected impact end time of the real-time crime.

In another aspect, a computing system for alerting a user of crime-prone locations is provided. The computing system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT bots, and/or other electronic or electrical components, which may be in wired or wireless communication with one another. For example, in one instance, the computing system may include (i) one or more processors, and (ii) a non-transitory memory storing one or more instructions. The instructions, when executed by the one or more processors, cause the one or more processors to: (1) receive, from a user device associated with the user, location data and motion data of the user device; (2) determine based upon the motion data, that the user has started a trip; (3) load an crime density map surrounding a location of the user device based upon the location data; (4) determine, based upon the crime density map, at least one crime-prone location within a scope of the crime density map, wherein the at least one crime-prone location meets at least one predetermined criterion; and/or (5) present, via the user device, an indication of the at least one crime-prone location. The computing system may include additional, less, or alternate functionality, including that discussed elsewhere herein.

In yet another aspect, a computer-readable medium is provided. For example, in one instance, the storing processor-executable may store instructions for alerting a user of crime-prone locations that, when executed by one or more processors, cause the one or more processors to (1) receive, from a user device associated with the user, location data and motion data of the user device; (2) determine based upon the motion data, that the user has started a trip; (3) load an crime density map surrounding a location of the user device based upon the location data; (4) determine, based upon the crime density map, at least one crime-prone location within a scope of the crime density map, wherein the at least one crime-prone location meets at least one predetermined criterion; and/or (5) present, via the user device, an indication of the at least one crime-prone location. The computer-readable medium may include additional, less, or alternate functionality, including that discussed elsewhere herein.

In yet another aspect, a computer-implemented method for alerting a user of crime-prone locations is provided. The method may be implemented via one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, ChatGPT-based bot, and/or other electronic or electrical components. For instance, in one example, the method may comprise: (1) determining, by one or more processors, a route from a starting location to a destination input by the user via a user device; (2) receiving, by the one or more processors from the user device, location data of the user device; (3) loading, by the one or more processors, an crime density map surrounding a location of the user device based upon the location data; (4) determining, by the one or more processors, based upon the location data and the crime density map, that the user device is approaching an crime-prone location along the route, wherein the crime-prone location that meets at least one predetermined criterion; (5) generating, by the one or more processors, at least one deviation route from the location of the user device to the destination, the at least one deviation route excluding the crime-prone location; and/or (6) presenting, by the one or more processors via the user device, an indication of the at least one deviation route. The method may include additional, fewer, or alternate actions, including those discussed elsewhere herein.

In some instances, the method further comprises: (1) receiving, by the one or more processors from the user device, an indication of whether the user accepts the at least one deviation route; (2) responsive to receiving an indication that the user accepts the at least one deviation route, determining, by the one or more processors, a first insurance-related action; and/or (3) responsive to receiving an indication that the user rejects the at least one deviation route, determining, by the one or more processors, a second insurance-related action.

In yet another aspect, a computing system for alerting a user of crime-prone locations is provided. The computing system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT bots, and/or other electronic or electrical components, which may be in wired or wireless communication with one another. For example, in one instance, the computing system may include (i) one or more processors, and (ii) a non-transitory memory storing one or more instructions. The instructions, when executed by the one or more processors, cause the one or more processors to: (1) determine a route from a starting location to a destination input by the user via a user device; (2) receive, from the user device, location data of the user device; (3) load an crime density map surrounding a location of the user device based upon the location data; (4) determine based upon the location data and the crime density map, that the user device is approaching an crime-prone location along the route, wherein the crime-prone location that meets at least one predetermined criterion; (5) generate at least one deviation route from the location of the user device to the destination, the at least one deviation route excluding the crime-prone location; and/or (6) present, via the user device, an indication of the at least one deviation route. The computing system may include additional, less, or alternate functionality, including that discussed elsewhere herein.

In yet another aspect, a computer-readable medium is provided. For example, in one instance, the storing processor-executable may store instructions for alerting a user of crime-prone locations that, when executed by one or more processors, cause the one or more processors to (1) determine a route from a starting location to a destination input by the user via a user device; (2) receive, from the user device, location data of the user device; (3) load an crime density map surrounding a location of the user device based upon the location data; (4) determine based upon the location data and the crime density map, that the user device is approaching an crime-prone location along the route, wherein the crime-prone location that meets at least one predetermined criterion; (5) generate at least one deviation route from the location of the user device to the destination, the deviation route excluding the crime-prone location; and/or (6) present, via the user device, an indication of the at least one deviation route. The computer-readable medium may include additional, less, or alternate functionality, including that discussed elsewhere herein.

In yet another aspect, a computer-implemented method for alerting a user of crime-prone locations is provided. The method may be implemented via one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, ChatGPT-based bot, and/or other electronic or electrical components. For instance, in one example, the method may comprise: (1) determining, by one or more processors, one or more routes from a starting location to a destination input by the user via a user device; (2) loading, by the one or more processors, an crime density map surrounding a location along the one or more routes; (3) selecting, by the one or more processors, at least one non-crime-prone route from the one or more routes, wherein the at least one non-crime-prone route meets at least one predetermined criterion; and/or (4) presenting, by the one or more processors via the user device, an indication of at least one non-crime-prone route. The method may include additional, fewer, or alternate actions, including those discussed elsewhere herein.

In some instances, the at least one predetermined criterion includes that the at least one route excludes the at least one non-crime-prone route excludes crime-prone locations, wherein the crime-prone locations meet at least one predetermined second criterion.

In some instances, the at least one predetermined second criterion includes that the at least one predetermined second criterion includes that the at least one non-crime-prone route is associated with a lowest damage expectation and/or adjusted damage expectation among the one or more routes.

In yet another aspect, a computing system for alerting a user of crime-prone locations is provided. The computing system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT bots, and/or other electronic or electrical components, which may be in wired or wireless communication with one another. For example, in one instance, the computing system may include (i) one or more processors, and (ii) a non-transitory memory storing one or more instructions. The instructions, when executed by the one or more processors, cause the one or more processors to: (1) determine one or more routes from a starting location to a destination input by the user via a user device; (2) load an crime density map surrounding a location along the one or more routes; (3) select at least one non-crime-prone route from the one or more routes, wherein the at least one non-crime-prone route meets at least one predetermined criterion; and/or (4) present, via the user device, an indication of at least one non-crime-prone route. The computing system may include additional, less, or alternate functionality, including that discussed elsewhere herein.

In yet another aspect, a computer-readable medium is provided. For example, in one instance, the storing processor-executable may store instructions for alerting a user of crime-prone locations that, when executed by one or more processors, cause the one or more processors to (1) determine one or more routes from a starting location to a destination input by the user via a user device; (2) load an crime density map surrounding a location along the one or more routes; (3) select at least one non-crime-prone route from the one or more routes, wherein the at least one non-crime-prone route meets at least one predetermined criterion; and/or (4) present, via the user device, an indication of at least one non-crime-prone route. The computer-readable medium may include additional, less, or alternate functionality, including that discussed elsewhere herein.

Additional, alternate and/or fewer actions, steps, features and/or functionality may be included in an aspect and/or embodiment, including those described elsewhere herein.

V. Additional Considerations

As used herein, the term "user" may refer to a person using an application and/or a user device disclosed herein. In some instances, a user may be a policyholder, a potential insurance customer, a person using an application disclosed herein on behalf of a policyholder or a potential insurance customer.

Unless otherwise indicated, the processes implemented by an ML chatbot may be implemented by an ML voice bot, an AI chatbot, an AI voice bot, and/or a large language model (LLM).

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112 (f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In exemplary embodiments, one or more computing systems (e.g., a standalone, client or server computing system) or one or more hardware modules of a computing system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

The systems and methods described herein are directed to an improvement to computer functionality, and improve the functioning of conventional computing systems.

What is claimed:

1. A computer-implemented method for alerting a user of incident-prone locations, comprising:

receiving, by one or more processors from a user device, location data of the user device and a destination input by the user;

determining, by the one or more processors, based upon the location data, that the user device is approaching the destination;

loading, by the one or more processors, an incident density map surrounding the destination, wherein the incident density map is generated by a chatbot, the chatbot being trained with a plurality of training incident density maps and historical or hypothetical incident data associated with the plurality of training incident density maps;

determining, by the one or more processors, based upon the incident density map, at least one non-incident-prone parking spot, wherein the at least one non-incident-prone parking spot meets at least one predetermined criterion; and presenting, by the one or more processors via the user device, an indication of the at least one non-incident-prone parking spot.

2. The computer-implemented method of claim 1, further comprising:

receiving, by the one or more processors from the user device, an indication of whether the user accepts the at least one non-incident-prone parking spot;

responsive to receiving an indication that the user accepts the at least one non-incident-prone parking spot, determining, by the one or more processors, a first insurance-related action; and responsive to receiving an indication that the user rejects the at least one non-incident-prone parking spot, determining, by the one or more processors, a second insurance-related action.

3. The computer-implemented method of claim 2, wherein:

the first insurance-related action is at least one of maintaining a current insurance policy for the user, decreasing an insurance premium for the user, and/or decreasing an insurance coverage for the user; and the second insurance-related action is at least one of maintaining a current insurance policy for the user, increasing an insurance premium for the user, and/or increasing an insurance coverage for the user.

4. The computer-implemented method of claim 1, wherein at least a portion of the historical incident data is at least one of an insurance claim document, an image, an audio, and/or a video associated with one or more incidents.

5. The computer-implemented method of claim 1, wherein the at least one predetermined criterion includes at least one of a distance between a location of the at least one non-incident-prone parking spot and the destination, a frequency of incidents associated with the at least one non-incident-prone parking spot, a type of incidents associated with the at least one non-incident-prone parking spot, a danger level of incidents associated with the at least one non-incident-prone parking spot, a recency of a latest incident associated with the at least one non-incident-prone parking spot, a similarity between a current time and a time of an incident associated with the at least one non-incident-prone parking spot, and/or a similarity between a current economic index and an economic index associated with a time of an incident associated with the at least one non-incident-prone parking spot.

6. A system for alerting a user of incident-prone locations, comprising:

one or more processors, and a non-transitory memory storing one or more instructions, the one or more instructions, when executed by the one or more processors, cause the one or more processors to:

receive, from a user device, location data of the user device and a destination input by the user;

determine, based upon the location data, that the user device is approaching the destination;

load an incident density map surrounding the destination, wherein the incident density map is generated by a chatbot, the chatbot being trained with a plurality of training incident density maps and historical or hypothetical incident data associated with the plurality of training incident density maps;

determine, based upon the incident density map, at least one non-incident-prone parking spot, wherein the at least one non-incident-prone parking spot meets at least one predetermined criterion; and present, via the user device, an indication of the at least one non-incident-prone parking spot.

7. A computer-implemented method for alerting a user of incident-prone locations, comprising:

receiving, by one or more processors from a user device, location data of the user device;

determining, by the one or more processors, based upon the location data, that the user has parked a vehicle in a particular location;

loading, by the one or more processors, an incident density map surrounding the particular location, wherein the incident density map is generated by a chatbot, the chatbot being trained with a plurality of training incident density maps and historical or hypothetical incident data associated with the plurality of training incident density maps;

determining, by the one or more processors, based upon the incident density map, that the particular location is an incident-prone location, wherein the incident-prone location meets at least one predetermined first criterion;

determining, by the one or more processors, based upon the incident density map, at least one non-incident-prone parking spot, wherein the at least one non-incident-prone parking spot meets at least one predetermined second criterion; and presenting, by the one or more processors via the user device, an indication of at least one non-incident-prone parking spot.

8. The computer-implemented method of claim 7, wherein:

the at least one predetermined first criterion includes at least one of a frequency of incidents associated with the particular location, a type of incidents associated with the particular location, a danger level of incidents associated with the particular location, a recency of a latest incident associated with the particular location, a similarity between a current time and a time of an incident associated with the particular location, and/or a similarity between a current economic index and an economic index associated with a time of an incident associated with the particular location; and the least one predetermined second criterion includes at least one of a distance between the at least one non-incident-prone parking spot and the particular location, a frequency of incidents associated with the at least one non-incident-prone parking spot, a type of incidents associated with the at least one non-incident-prone parking spot, a danger level of incidents associated with the at least one non-incident-prone parking spot, a recency of a latest incident associated with the at least one non-incident-prone parking spot, a similarity between a current time and a time of an incident associated with the at least one non-incident-prone parking spot, and/or a similarity between a current economic index and an economic index associated with a time of an incident associated with the at least one non-incident-prone parking spot.

9. The computer-implemented method of claim 7, further comprising:

receiving, by the one or more processors from the user device, an indication of whether the user has moved the vehicle to the at least one non-incident-prone parking spot;

responsive to receiving an indication that the user moved the vehicle to the at least one non-incident-prone parking spot, determining, by the one or more processors, a first insurance-related action; and responsive to receiving an indication that the user has parked the vehicle in the particular location for a predetermined time period, determining, by the one or more processors, a second insurance-related action.

10. The computer-implemented method of claim 7, wherein at least a portion of the historical incident data is at least one of an insurance claim document, an image, an audio, and/or a video associated with one or more incidents.

11. A computer-implemented method for alerting a user of incident-prone locations, comprising:

receiving, by one or more processors from a user device, location data of the user device and a destination input by the user;

determining, by the one or more processors, based upon the location data, that the user device is approaching the destination;

loading, by the one or more processors, an incident density map surrounding the destination, wherein the incident density map is generated by:

receiving a prompt for generating an incident density map;

transmitting the prompt to a chatbot to generate a script for generating the incident density map, wherein the script is compliant for use by a density map generator; and transmitting, to the density map generator, the script and historical incident data to cause the density map generator to generate the incident density map;

determining, by the one or more processors, based upon the incident density map, at least one non-incident-prone parking spot, wherein the at least one non-incident-prone parking spot meets at least one predetermined criterion; and presenting, by the one or more processors via the user device, an indication of the at least one non-incident-prone parking spot.

12. The computer-implemented method of claim 11, wherein transmitting, to the density map generator, the script and the historical incident data to generate the incident density map includes:

transmitting, to the density map generator, the script and the historical incident data to cause the density map generator to generate the incident density map that shows at least one of frequencies of crimes incidents distributed on the incident density map, types of crimes incidents distributed on the incident density map, and/or danger levels of incidents distributed on the incident density map.

13. The computer-implemented method of claim 11, wherein the chatbot is trained with a plurality of prompts for generating incident density maps, and a plurality of scripts for generating the incident density maps compliant for use by the density map generator.

14. A computer-implemented method for alerting a user of incident-prone locations, comprising:

receiving, by one or more processors from a user device, location data of the user device and a destination input by the user;

determining, by the one or more processors, based upon the location data, that the user device is approaching the destination;

loading, by the one or more processors, an incident density map surrounding the destination;

determining, by the one or more processors, based upon the incident density map, at least one non-incident-prone parking spot, wherein the at least one non-incident-prone parking spot meets at least one predetermined first criterion;

presenting, by the one or more processors via the user device, an indication of the at least one non-incident-prone parking spot;

receiving, by the one or more processors, real-time incident data associated with a real-time incident;

determining, by the one or more processors, whether the real-time incident data meets at least one predetermined second criterion; and responsive to determining that real-time incident meets the at least one predetermined second criterion, presenting, by the one or more processors via the user device, an indication of the real-time incident.

15. The computer-implemented method of claim 14, wherein the at least one predetermined second criterion includes at least one of a distance between a location of the user device and a location of the real-time incident, a type of the real-time incident, an impact scope of the real-time incident, an impact level of the real-time incident, a reporting time of the real-time incident, an expected impact duration of the real-time incident, and/or an expected impact end time of the real-time incident.

16. A system for alerting a user of incident-prone locations, comprising:

one or more processors, and a non-transitory memory storing one or more instructions, the one or more instructions, when executed by the one or more processors, cause the one or more processors to:

receive, from a user device, location data of the user device and a destination input by the user;

determine, based upon the location data, that the user device is approaching the destination;

load an incident density map surrounding the destination, wherein the incident density map is generated by:

receiving a prompt for generating an incident density map;

transmitting the prompt to a chatbot to generate a script for generating the incident density map, wherein the script is compliant for use by a density map generator; and transmitting, to the density map generator, the script and historical incident data to cause the density map generator to generate the incident density map;

determine, based upon the incident density map, at least one non-incident-prone parking spot, wherein the at least one non-incident-prone parking spot meets at least one predetermined criterion; and present, via the user device, an indication of the at least one non-incident-prone parking spot.

\* \* \* \* \*